(12) United States Patent
Oba et al.

(10) Patent No.: US 8,332,923 B2
(45) Date of Patent: Dec. 11, 2012

(54) KERBERIZED HANDOVER KEYING

(75) Inventors: Yoshihiro Oba, Englewood Cliffs, NJ (US); Subir Das, Kendall Park, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 876 days.

(21) Appl. No.: 11/972,450

(22) Filed: Jan. 10, 2008

(65) Prior Publication Data
US 2008/0175393 A1 Jul. 24, 2008

Related U.S. Application Data

(60) Provisional application No. 60/885,795, filed on Jan. 19, 2007.

(51) Int. Cl.
*H04L 29/04* (2006.01)
(52) U.S. Cl. ............... 726/10; 726/5; 380/277; 380/278; 380/279
(58) Field of Classification Search .......... 380/277–279; 726/10, 5
See application file for complete search history.

(56) References Cited

U.S. PATENT DOCUMENTS

| | | | | |
|---|---|---|---|---|
| 2002/0147820 A1* | 10/2002 | Yokote | | 709/229 |
| 2004/0078571 A1* | 4/2004 | Haverinen | | 713/168 |
| 2005/0198506 A1* | 9/2005 | Qi et al. | | 713/170 |
| 2006/0073811 A1* | 4/2006 | Ekberg | | 455/411 |
| 2006/0140150 A1* | 6/2006 | Olvera-Hernandez et al. | | 370/331 |
| 2006/0224891 A1* | 10/2006 | Ilac et al. | | 713/171 |
| 2007/0008926 A1 | 1/2007 | Oba | | |
| 2008/0134311 A1* | 6/2008 | Medvinsky et al. | | 726/7 |

FOREIGN PATENT DOCUMENTS

| | | |
|---|---|---|
| JP | 05-048014 | 2/1993 |
| WO | 2008/088092 A2 | 7/2008 |
| WO | 2008/091517 A1 | 7/2008 |

OTHER PUBLICATIONS

Aboba et al.; RFC 3748—EAP; Jun. 2004; Retrieved from http://www.faqs.org/rfcs/rfc3748.html.*

(Continued)

*Primary Examiner* — Carl Colin
*Assistant Examiner* — Chau Le
(74) *Attorney, Agent, or Firm* — Westerman, Hattori, Daniels & Adrian, LLP

(57) ABSTRACT

A media-independent handover key management architecture is disclosed that uses Kerberos for secure key distribution among a server, an authenticator, and a mobile node. In the preferred embodiments, signaling for key distribution is based on re-keying and is decoupled from re-authentication that requires EAP (Extensible Authentication Protocol) and AAA (Authentication, Authorization and Accounting) signaling similar to initial network access authentication. In this framework, the mobile node is able to obtain master session keys required for dynamically establishing the security associations with a set of authenticators without communicating with them before handover. By separating re-key operation from re-authentication, the proposed architecture is more optimized for a proactive mode of operation. It can also be optimized for reactive mode of operation by reversing the key distribution roles between the mobile node and the target access node.

20 Claims, 20 Drawing Sheets

OTHER PUBLICATIONS

Giaretta et al., Usage Scenarios and Requirements for Multi-hop EAP Lower Layer, Feb. 2005, Retrieved from http://www.potaroo.net/ietf/all-ids/draft-ohba-multihop-eap-00.txt, pp. 1-22.*

Tschofenig et al., Bootstrapping Kerberos, Jul. 2004, Retrieved from http://tools.ietf.org/pdf/draft-tschofenig-pana-bootstrap-kerberos-00.pdf, pp. 1-21.*

International Search Report, dated Apr. 18, 2008.

B. Aboba et al., "EAP GSS Authentation Protocol; draft-aboda-pppext-eapgss-12.txt," IETF Standard Working Draft, Internet Engineering Task Force, IETF, Ch. No. 12; Apr. 6, 2002.

M. Park et al., "A New User Authentication Protcol for Mibile Terminals in Wireless Network," 7th Int'l Conf on Mobile Data Management, 2006; Piscataway, NJ; May 10, 2006.

Mohamed A. Kaafar, "A Kerberos-Based Authentication Architecture for Wireless LANs," Networking 2004, LNCS 3042; Apr. 8, 2004;pp. 1344-1353.

S. Zrelli et al.,"Single sign-on framework for AAA operations within commerical mobile networks," 1st Int'l Conf. on Availability,Reliability&Security 2006; Apr. 20, 2006, pp. 74-81.

International Search Report mailed Jul. 30, 2008.

Japanese Office Action dated Sep. 27, 2011, issued in corresponding Japanese Patent Application No. 2009-530444.(w/partial English translation).

Canadian Office Action dated Mar. 6, 2012, issued in corresponding Canadian Patent Application No. 2,675,961; (4 pages).

* cited by examiner

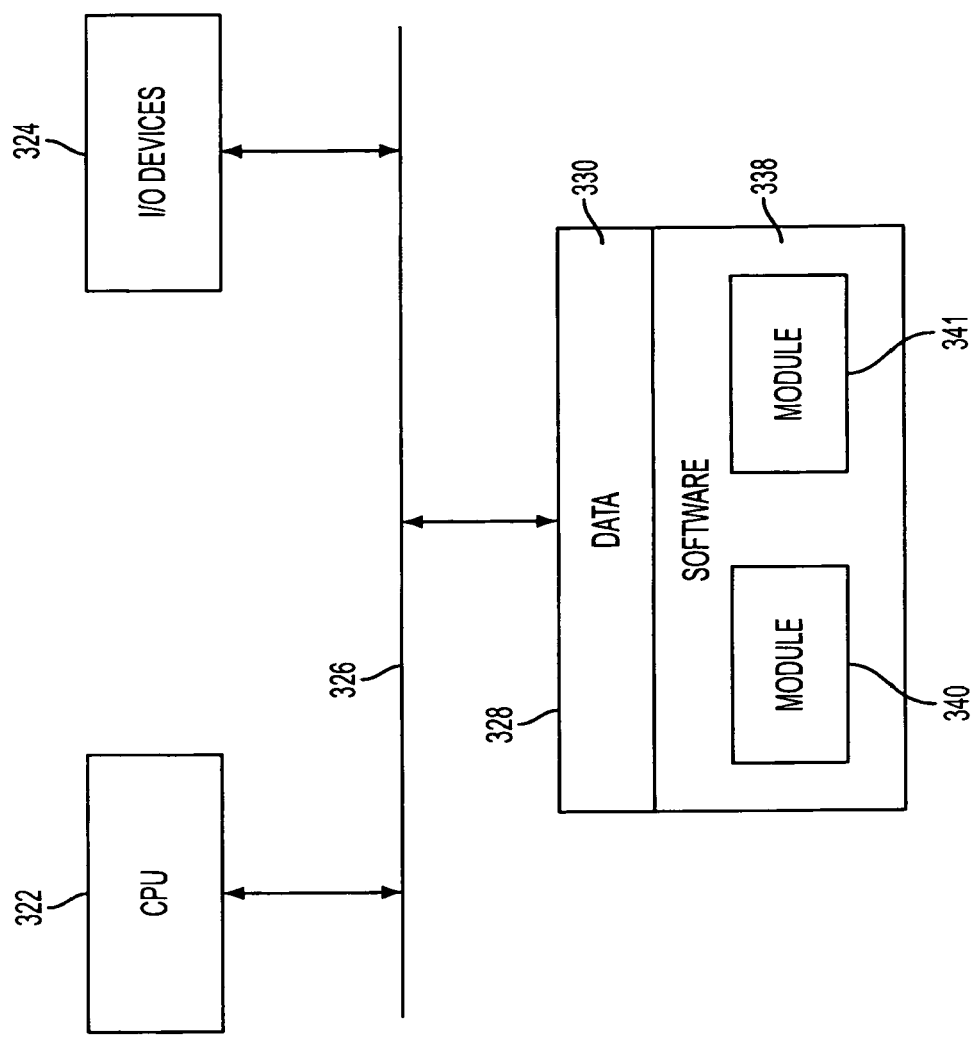

KERBERIZED HANDOVER KEYING

The present application claims priority under 35 U.S.C. 119 as being a Non-provisional of Provisional Application Ser. No. 60/885,795, entitled Kerberized Handover Keying, filed on Jan. 19, 2007.

BACKGROUND

General Background Discussion

Background Applications:

For background reference, the entire disclosures of each of the following patent applications are incorporated herein by reference: 1) Provisional Application Ser. No. 60/885,795, entitled Kerberized Handover Keying, filed on Jan. 19, 2007, including all Appendices; 2) Provisional Application Ser. No. 60/892,532, entitled Kerberized Handover Keying Improvements, filed on Mar. 1, 2007, including all Appendices; 3) Non-provisional application Ser. No. 11/867,659, entitled An EAP Method for EAP Extension (EAP-EXT), filed on Oct. 4, 2007; and 4) Non-provisional application Ser. No. 11/944,605, entitled Bootstrapping Kerberos from EAP, filed on Nov. 24, 2007.

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Background Regarding Kerberos:

Kerberos is a network authentication protocol. See: web.mit.edu/Kerberos/. It provides authentication for client/server applications by using secret-key cryptography. A free implementation of this protocol is available from the Massachusetts Institute of Technology. Kerberos is available in many commercial products as well.

Kerberos is a secure method for authenticating a request for a service in a computer network. Kerberos lets a user request an encrypted ticket from an authentication process that can then be used to request a particular service from a server. The user's password does not have to pass through the network.

Kerberos [RFC1510] is a well-known security protocol which provides authentication, authorization and key distribution. It is used to secure a number of protocols.

Kerberos allows the client A to obtain an initial ticket to access a Ticket Granting Service (TGS) without requiring the user to re-entry the password. That initial ticket allows the client A to start a Kerberos negotiation with TGS to obtain another ticket for accessing the service B. By using this approach, Kerberos also allows a cross-realm operation where A can recover a ticket from a remote TGS (in A's Home Domain) to access a local TGS (in the visited domain). However, Kerberos requires time synchronization among the three parties.

In some examples, by combining the flexibility of the EAP framework with the wide deployment of Kerberos in universities and corporate networks it is possible to bootstrap a Kerberos Ticket Granting Ticket. This Kerberos Ticket Granting Ticket can then be used to retrieve service tickets for usage with a variety of protocols. This approach of bootstrapping Kerberos ticket with the help of an EAP protocol interaction is described in [I-D.tschofenig-pana-bootstrap-kerberos], the entire disclosure of which is incorporated herein by reference.

Another approach to combine EAP and Kerberos is to integrate an EAP-based pre-authentication mechanism into Kerberos. However, using a generic protocol for bootstrapping credentials can also be used for bootstrapping symmetric keys for usage Mobile IP (as discussed as part of the MIPv6 bootstrapping work [I-D.ietf-mip6-bootstrap-ps]) or also to bootstrap public/private keys. Therefore, it would be necessary to confidentiality protect the delivery of an ephemeral public and private key pair to the end host. This key pair would have a short lifetime, possibly without the need for revocation mechanisms, and could be used in all security protocols utilizing public key based mechanisms (including IKEv2 or TLS). A big advantage is the avoided public key infrastructure since authentication protocols based on symmetric cryptography can still be used within EAP. As discussed in the below section, the Extensible Authentication Protocol (EAP) [see RFC3748 incorporated herein by reference in its entirety] provides authentication methods. In some examples, a PANA protocol [I-D.ietf-pana-pana] carries EAP messages between a PaC (PANA Client) and a PAA (PANA Authentication Agent) in the access network.

Background Regarding EAP:

Referring to reference to Aboba, RFC 3748 (cited below), illustrative aspects of Extensible Authentication Protocol (EAP) is set forth. EAP is an authentication framework which supports multiple authentication methods. EAP typically runs directly over data link layers such as Point-to-Point Protocol (PPP) or IEEE 802, without requiring IP. EAP provides its own support for duplicate elimination and retransmission, but is reliant on lower layer ordering guarantees. Fragmentation is not supported within EAP itself; however, individual EAP methods may support this.

EAP may be used on dedicated links, as well as switched circuits, and wired as well as wireless links. To date, EAP has been implemented with hosts and routers that connect via switched circuits or dial-up lines using PPP [RFC1661]. It has also been implemented with switches and access points using IEEE 802 [IEEE-802]. EAP encapsulation on IEEE 802 wired media is described in [IEEE-802.1X], and encapsulation on IEEE wireless LANs in [IEEE-802.11i].

One of the advantages of the EAP architecture is its flexibility. EAP is used to select a specific authentication mechanism, typically after the authenticator requests more information in order to determine the specific authentication method to be used. Rather than requiring the authenticator to be updated to support each new authentication method, EAP permits the use of a backend authentication server, which may implement some or all authentication methods, with the authenticator acting as a pass-through for some or all methods and peers.

Within this latter cited document, authenticator requirements apply regardless of whether the authenticator is operating as a pass-through or not. Where the requirement is meant to apply to either the authenticator or backend authentication server, depending on where the EAP authentication is terminated, the term "EAP server" has been used.

EAP was designed for use in network access authentication, where IP layer connectivity may not be available. EAP is a lock-step protocol which only supports a single packet in flight. As a result, EAP cannot efficiently transport bulk data, unlike transport protocols such as TCP or SCTP.

While EAP provides support for retransmission, it assumes ordering guarantees provided by the lower layer, so out of order reception is not supported.

Since EAP does not support fragmentation and reassembly, EAP authentication methods generating payloads larger than the minimum EAP MTU need to provide fragmentation support.

While authentication methods such as EAP-TLS provide support for fragmentation and reassembly, the EAP methods defined in this latter cited document do not. As a result, if the EAP packet size exceeds the EAP MTU of the link, these methods will encounter difficulties.

EAP authentication is initiated by the server (authenticator), whereas many authentication protocols are initiated by the client (peer). As a result, it may be necessary for an authentication algorithm to add one or two additional messages (at most one roundtrip) in order to run over EAP.

Where certificate-based authentication is supported, the number of additional roundtrips may be much larger due to fragmentation of certificate chains. In general, a fragmented EAP packet will require as many round-trips to send as there are fragments. For example, a certificate chain 14960 octets in size would require ten round-trips to send with a 1496 octet EAP MTU. Where EAP runs over a lower layer in which significant packet loss is experienced, or where the connection between the authenticator and authentication server experiences significant packet loss, EAP methods requiring many round-trips can experience difficulties. In these situations, use of EAP methods with fewer roundtrips is advisable.

The EAP authentication exchange proceeds as follows:

[1] The authenticator sends a Request to authenticate the peer. The Request has a Type field to indicate what is being requested. Examples of Request Types include Identity, MD5-challenge, etc. The MD5-challenge Type corresponds closely to the CHAP authentication protocol [see: RFC1994]. Typically, the authenticator will send an initial Identity Request; however, an initial Identity Request is not required, and can be bypassed. For example, the identity may not be required where it is determined by the port to which the peer has connected (leased lines, dedicated switch or dial-up ports), or where the identity is obtained in another fashion (via calling station identity or MAC address, in the Name field of the MD5-Challenge Response, etc.).

[2] The peer sends a Response packet in reply to a valid Request. As with the Request packet, the Response packet contains a Type field, which corresponds to the Type field of the Request.

[3] The authenticator sends an additional Request packet, and the peer replies with a Response. The sequence of Requests and Responses continues as long as needed. EAP is a 'lock step' protocol, so that other than the initial Request, a new Request cannot be sent prior to receiving a valid Response. The authenticator is responsible for retransmitting requests. After a suitable number of retransmissions, the authenticator should end the EAP conversation. The authenticator needs to not send a Success or Failure packet when retransmitting or when it fails to get a response from the peer.

[4] The conversation continues until the authenticator cannot authenticate the peer (unacceptable Responses to one or more Requests), in which case the authenticator implementation needs to transmit an EAP Failure (Code 4). Alternatively, the authentication conversation can continue until the authenticator determines that successful authentication has occurred, in which case the authenticator needs to transmit an EAP Success (Code 3). Id.

Among other advantages, the EAP protocol can support multiple authentication mechanisms without having to pre-negotiate a particular one. In addition, Network Access Server (NAS) devices (such as, e.g., a switch or Access Point (AP)) do not have to understand each authentication method and may act as a pass-through agent for a backend authentication server. Support for pass-through is optional. An authenticator may authenticate local peers, while at the same time acting as a pass-through for non-local peers and authentication methods it does not implement locally. Additionally, separation of the authenticator from the backend authentication server simplifies credentials management and policy decision making.

Conceptually, EAP implementations consist of the following components:

[a] Lower layer. The lower layer is responsible for transmitting and receiving EAP frames between the peer and authenticator. EAP has been run over a variety of lower layers including PPP, wired IEEE 802 LANs [see: IEEE-802.1X], IEEE 802.11 wireless LANs [IEEE-802.11], UDP (L2TP [RFC2661] and IKEv2), and TCP.

[b] EAP layer. The EAP layer receives and transmits EAP packets via the lower layer, implements duplicate detection and retransmission, and delivers and receives EAP messages to and from the EAP peer and authenticator layers.

[c] EAP peer and authenticator layers. Based on the Code field, the EAP layer de-multiplexes incoming EAP packets to the EAP peer and authenticator layers. Typically, an EAP implementation on a given host will support either peer or authenticator functionality, but it is possible for a host to act as both an EAP peer and authenticator. In such an implementation both EAP peer and authenticator layers will be present.

[d] EAP method layers. EAP methods implement the authentication algorithms and receive and transmit EAP messages via the EAP peer and authenticator layers. Since fragmentation support is not provided by EAP itself, this is the responsibility of EAP methods. Id.

The later cited reference sets forth the following definitions, which are cited herein for reference.

Authenticator:

The end of the link initiating EAP authentication. The term authenticator is used in [IEEE-802.1X], and has a similar meaning in this document.

Peer:

The end of the link that responds to the authenticator. In [IEEE-802.1X], this end is known as the Supplicant.

Backend Authentication Server:

A backend authentication server is an entity that provides an authentication service to an authenticator. When used, this server typically executes EAP methods for the authenticator. This terminology is also used in [IEEE-802.1X].

AAA:

Authentication, Authorization, and Accounting (AAA) protocols with EAP support include RADIUS and Diameter. In this document, the terms "AAA server" and "backend authentication server" are used interchangeably.

EAP Server or Server:

The entity that terminates the EAP authentication method with the peer. In the case where no backend authentication server is used, the EAP server is part of the authenticator. In the case where the authenticator operates in pass-through mode, the EAP server is located on the backend authentication server.

Successful Authentication:

In the context of this document, "successful authentication" is an exchange of EAP messages, as a result of which the authenticator decides to allow access by the peer, and the peer decides to use this access. The authenticator's decision typically involves both authentication and authorization aspects; the peer may successfully authenticate to the authenticator, but access may be denied by the authenticator due to policy reasons.

Master Session Key (MSK):

Keying material that is derived between the EAP peer and server and exported by the EAP method. The MSK is at least 64 octets in length. In existing implementations, an AAA server acting as an EAP server transports the MSK to the authenticator.

Extended Master Session Key (EMSK):

Additional keying material derived between the EAP client and server that is exported by the EAP method. The EMSK is at least 64 octets in length. The EMSK is not shared with the authenticator or any other third party. The EMSK is reserved for future uses that are not defined yet.

EAP Extension:

For reference, we refer to EAP Extensions for EAP Reauthentication Protocol (ERP), IETF Internet Draft, Aug. 24, 2007, of V. Narayanan, et al., seen at www.ietf.org/internet-drafts/draft-ietf-hokey-erx-04.txt. The reference explains EAP Extensions for EAP Reauthentication Protocol as follows. "The extensible authentication protocol (EAP) is a generic framework for transport of methods that authenticate two parties; the authentication is either one-way or mutual. The primary purpose is network access control, and a key generating method is recommended to enforce access control. The EAP keying hierarchy defines two keys that are derived at the top level—the master session key (MSK) and the extended MSK (EMSK). In the most common deployment scenario, a peer and a server authenticate each other through a third party known as the authenticator. The authenticator or an entity controlled by the authenticator enforces access control. After successful authentication, the server transports the MSK to the authenticator; the authenticator and the peer derive transient session keys (TSK) using the MSK as the authentication key or a key derivation key and use the TSK for per-packet access enforcement." Id. "When a peer moves from one authenticator to another, it is desirable to avoid full EAP authentication. The full EAP exchange with another run of the EAP method takes several round trips and significant time to complete, causing delays in handoff times. Some EAP methods specify the use of state from the initial authentication to optimize Re-authentications by reducing the computational overhead, but method-specific Re-authentication takes at least 2 roundtrips in most cases. It is also important to note that many methods do not offer support for Re-authentication. Thus, it is beneficial to have efficient Re-authentication support in EAP rather than in individual methods." Id.

"Key sharing across authenticators is sometimes used as a practical solution to lower handoff times. In that case, compromise of an authenticator results in compromise of EAP sessions established via other authenticators." Id. "In conclusion, there is a need to design an efficient EAP Re-authentication mechanism that allows a fresh key to be established between the peer and an authenticator without having to execute the EAP method again." Id. "This document specifies EAP Reauthentication Extensions (ERX) for efficient re-authentication using EAP. The EAP Reauthentication Protocol (ERP) based on ERX supports EAP method independent Re-authentication for a peer that has valid, unexpired key material from a previously performed EAP authentication. The protocol and the key hierarchy required for EAP Reauthentication is described in this document." Id.

Extension of EAP (EAP-EXT):

The present application provides further developments over, among other things, the inventions as set forth in the present assignees' prior U.S. non-provisional application Ser. No. 11/867,659, filed on Oct. 4, 2007, to Y. Oba, et al., and U.S. provisional application Ser. No. 60/869,113, filed on Dec. 8, 2006, to Y. Oba, et al., both entitled AN EAP METHOD FOR EAP EXTENSION (EAP-EXT), the entire disclosures of which are incorporated herein by reference as though recited herein in full. For background reference, information related to technology of said background application of the present assignees is incorporated in the following paragraphs.

1. Introduction to EAP-EXT

Further to the above discussion, EAP (Extensible Authentication Protocol) is an authentication protocol which supports multiple authentication algorithms known as "EAP methods" [RFC3748]. In EAP, an EAP peer and an EAP server generates EAP keying material, i.e., MSK (Master Session Key) and EMSK (Extended Master Session Key). A detailed framework for the generation, transport and usage of MSK is described in [I-D.ietf-eap-keying].

There is an extended functionality of EAP [RFC3748] by defining several usages of EMSK (Extended Master Session Key) where one of the EMSK usages is re-authentication. Another extended functionality of EAP is a channel binding scheme defined in [I-D.ohba-eap-channel-binding]. For further background reference regarding channel binding, the entire disclosure of co-pending application Ser. No. 11/379,568, entitled CHANNEL BINDING MECHANISM BASED PARAMETER BINDING IN KEY DERIVATION, filed on Apr. 20, 2006, to Y. Ohba, is incorporated herein by reference in its entirety. Since implementations that support an extended functionality of EAP need to interoperate with implementations that do not support the extended functionality such that the former implementations can disable the extended functionality when communicating with the latter implementations, a mechanism is needed for an EAP peer and an EAP server to negotiate on the capabilities with regard to the extended functionality of EAP is needed.

There are two basic approaches for extending EAP functionality. One approach is to define new EAP Codes to realize the extended EAP functionality in addition to the existing ones, i.e., Request, Response, Success and Failure. This approach, however, requires changes to RFC3748 and may also require changes to lower layer protocols. The other approach is to define a new EAP method to realize the extended functionality. This document takes the latter approach to minimize the impact on the existing EAP deployment.

EAP-EXT is an EAP method for extending EAP functionality. In some preferred embodiments, the extended EAP functionality includes channel binding and re-authentication. The EAP-EXT method also allows sequencing of multiple EAP methods inside it.

2. EAP-EXT Overview

In the preferred embodiments, EAP-EXT provides capabilities exchange. In this regard, bits within the messages can be used for indication of capability. In some embodiments, one bit (R-bit) is used for indicating Re-authentication capability. In some embodiments, one bit (C-bit) is used for indicating channel binding capability.

When EAP-EXT is used, the precedent EAP-Identity exchange can be omitted if the identity of the peer is known to the server before the server sends the first EAP-Request. In this regard, there are several outband mechanisms for providing the identity of the peer to the server, e.g., transferring the identity of the peer between authenticators and servers.

In EAP-EXT, extended EAP capabilities such as, e.g., channel binding and re-authentication are exchanged between the peer and the server. At the same time, at least one EAP method (e.g., EAP-TLS) is run inside EAP-EXT for authenticating the peer. Until an inner method generates EAP keying material, no AUTH TLV (Type-Length-Value) is included and the capabilities are non-protected. Hence, if there is only one inner EAP method, additional EAP-EXT exchange(s) with an AUTH TLV but without a Method TLV is performed before sending an EAP-Success or an EAP-Failure message. For background reference regarding TLVs (Type-Length-Value), it is noted that in data communication protocols information may be encoded as a Type-Length-Value or TLV element inside of the protocol. By way of example, type and length fields are typically fixed in size (e.g., a few bytes) and the value field is typically variable size. These fields typically used as follows: type—a numeric code which indicates the kind of field that this part of the message represents; length—the size of the value field (typically in bytes); and value—variable sized set of bytes which contains data for this part of the message. Some of the advantages of using a TLV representation include: TLV sequences are easily searched using generalized parsing functions; new message elements which are received at an older node can be safely skipped and the rest of the message can be parsed; and TLV elements are typically used in a binary format which makes parsing faster and the data smaller.

After an inner EAP method generates EAP keying material, EAP-EXT messages need to be protected with an AUTH TLV. AUTH TLVs in EAP-EXT messages need to be computed using EAP-EXT-KEY generated from EAP keying material of the latest successful inner method. This means that if there are multiple inner EAP methods that are sequentially run inside EAP-EXT, a new EAP-EXT-KEY is generated each time an inner EAP method in the sequence generates EAP keying material. Any inner EAP method needs to be capable of generating EAP keying material.

At the end of a successful EAP-EXT run, the EAP keying material generated by the last successful inner EAP method is exported to the EAP layer. F-bit is used for indicating the end of EXP-EXT exchange.

FIG. 1 shows an example of EAP-EXT message sequence with a single inner EAP method. FIG. 2 shows an example of EAP-EXT message sequence with multiple inner EAP methods.

3. Error Handling

An error may happen for several reasons, e.g., due to failure of inner EAP method authentication or a malformed, unknown or missing EAP-EXT TLV. An error may be detected either by the peer or by the server. An EAP-EXT message that caused an error is referred to as an erroneous message. EAP-EXT messages with E-bit set are used for error indications. These messages are referred to as error indications. An error indication needs to contain an AUTH TLV, and should not contain other TLVs.

Any erroneous message (including an erroneous error indication) without a valid AUTH TLV needs to be silently discarded.

For an erroneous Request with a valid AUTH TLV, the peer sends an error indication Response. For an erroneous Response with a valid AUTH TLV, the server sends an error indication Request which is responded by the peer with an error indication Response. The server returns an EAP-Failure message in response to an error indication Response with a valid AUTH TLV.

4. Integrity Protection Keys

EAP-EXT defines two types of keys: 1) EAP-EXT-KEY and 2) EAP-REAUTH-KEY.

4.1. EAP-EXT-KEY

EAP-EXT-KEY is used for computing AUTH TLVs for integrity protecting EAP-EXT messages. When HMAC-SHA-256 (see, e.g., reference [sha256] incorporated by reference below) is used for the integrity algorithm, the length of EAP-EXT-KEY is 32-octet. An EAP-EXT-KEY is derived from the EMSK generated by an inner EAP method using the USRK (Usage Specific Root Key) derivation algorithm defined in (see, e.g., reference [I-D.salowey-eap-emsk-deriv] incorporated by reference below) as follows.

EAP-EXT-KEY=KDF (EMSK, "EAP-EXT-Integrity-Key", length).

In KDF, EAP-EXT-KEY uses the default PRF specified in reference [I-D.salowey-eap-emsk-deriv] incorporated by reference below.

For background reference, the USRK key derivation function (KDF) derives an USRK from the Extended Master Session Key (EMSK), an key label, optional data, and output length. The KDF is expected to give the same output for the same input. The basic key derivation function is: USRK=KDF(EMSK, key label, optional data, length). See Id. Typically, the key labels are printable ASCII strings unique for each usage definition and are a maximum of 255 bytes. See Id. In general, they are of the form label-string@domain where domain is the organization that controls the specification of the usage definition of the USRK. The key label provides global uniqueness. Rules for allocation of these labels are given in Section 7 of [I-D.salowey-eap-emsk-deriv].

As set forth in said document, the EMSK key derivation function is based on a pseudo random function (PRF) that has the following function prototype:

KDF=PRF(key, data). See Id. The default PRF used for deriving USRKs from an EMSK is taken from the PRF+ key expansion PRF from [RFC4306] based on HMAC-SHA-256. The prf+ construction was chosen because of its simplicity and efficiency over other PRFs such as those used in [RFC2246]. The definition of PRF+ from [RFC4306] is given below:

$$prf+(K,S)=T1|T2|T3|T4|$$

Where:

T1=prf(K,S|0x01)
T2=prf(K,T1|S|0x02)
T3=prf(K,T2|S|0x03)
T4=prf(K,T3|S|0x04)

continuing as needed to compute the required length of key material.

The key, K, is the EMSK and S is the data defined in Section 3.1 of [I-D.salowey-eap-emsk-deriv]. See Id. As indicated, the PRF is taken as HMAC-SHA-256. See Id.

4.2. EAP-REAUTH-KEY

EAP-REAUTH-KEY is used as the pre-shared key required by an EAP method used for a re-authentication mechanism. The length of EAP-REAUTH-KEY depends on the re-authentication mechanism. The EAP-REAUTH-KEY is derived from the EMSK exported from EAP-EXT using the USRK derivation algorithm defined in reference [I-D.salowey-eap-emsk-deriv] incorporated below as follows.

EAP-REAUTH-KEY=KDF(EMSK, "EAP-EXT-Reauthentication-Key", length).

5. Message Format

EAP-EXT uses EAP Type X (To be assigned by IANA). The message format including the common EAP fields (e.g., Code, Identifier, Length and Type) defined in [RFC3748] is shown in FIG. 3(A).

F:

This bit needs to be set to indicate that this is the last EAP-EXT message from the sender. Otherwise, this bit needs to not be set.

This bit is set when the message is an error indication. When this bit is set, F-bit needs to also be set. See Section 3 for detailed description on error indications.

Version:

This 8-bit field indicates the version of the EAP-EXT method. This document defines Version 1.

Reserved:

This 6-bit field is reserved for future extensions. This field needs to be set to zero by the sender and the recipient needs to ignore this field.

Capabilities:

This field The Capabilities field contains extended EAP capabilities. The Capabilities field the format shown in FIG. 3(B).

Each bit corresponds to a particular capability. The semantics of each bit is as follows.

C:

This bit is set to indicate that the sender supports the channel binding mechanism defined in [I-D.ohba-eap-channel-binding] for MSK. When this bit is set for both Requests and Responses and the EAP-EXT method completes with success, the peer and the server needs to enable channel binding mechanism. The default hash algorithm for prf+ is AUTH_H-MAC_SHA1_160.

R:

This bit is set to indicate that the sender supports a re-authentication EAP method. When this bit is set in the final Request/EXT message (i.e., the Request/EXT with F-bit is set), the message needs to include a Server-ID TLV and a Peer-ID TLV and can include a Reauth-Key-Lifetime AVP. When this bit is set in the final Request/EXT and Response/EXT exchanges, the peer and the server needs to generate an EAP-REAUTH-KEY. The Server-ID and Peer-ID contained in the Server-ID and Peer-ID TLVs and the EAP-REAUTH-KEY is used for a re-authentication EAP method. A default re-authentication mechanism can be selected by those in the art based on this disclosure.

Other bits are reserved for future use, and needs to be set to zero by the sender and needs to be ignored by the recipient.

TLV (Type-Length-Value's):

Zero, one or more TLVs. The TLV format of is shown in FIG. 3(C).

Type:

This field indicates the type of this TLV.

Length:

This field indicates the length of this TLV in octets, including the Type and Length fields of the TLV.

Value:

This field contains data specific to the TLV Type.

6. EAP-EXT TLVs

The following TLVs are defined.

6.1. Method TLV

The Method TLV (Type 1) contains an EAP Method payload starting from Type field.

6.2. AUTH TLV

The AUTH TLV (Type 2) contains integrity data used for protecting EAP-EXT messages. The EAP-EXT-KEY is used for computing AUTH TLVs.

The TLV-Value field is computed over the entire EAP message including this field. Before computing the integrity data, this field needs to be initialized to all zeros. The length of this field depends on the integrity algorithm in use. When the integrity check fails, the message needs to be silently discarded. The default integrity algorithm is HMAC-SHA-256 (see, e.g., reference [sha256] incorporated below).

6.3. Peer-ID TLV

The Peer-ID TLV (Type 3) contains the identity of the peer used for re-authentication.

6.4. Server-ID TLV

The Server-ID TLV (Type 4) contains the identity of the server used for re-authentication.

6.5. Reauth-Key-Lifetime TLV

The Reauth-Key-Lifetime TLV (Type 5) contains the lifetime of EAP-REAUTH-KEY in seconds.

7. Security Considerations

Capability exchange before an inner EAP method exports EAP keying material is unprotected. Hence, additional protected message exchange after creation of EAP keying material is mandated to avoid the capabilities information to be altered by an attacker without being detected by the peer and the server.

EAP-EXT allows sequencing of multiple EAP methods inside it. It is known that a compound authentication method that consists of multiple nested or sequential authentication methods without cryptographically binding them has a vulnerability to man-in-the-middle attack. EAP-EXT is able to create the required cryptographically binding by protecting each inner EAP method together with the outer EAP method (i.e., EAP-EXT) with a key generated by its precedent successful inner method in the sequence and finally exporting EAP keying material generated by the last successful inner EAP method. In order to achieve cryptographic binding, EAP-EXT requires inner EAP methods to be capable of generating EAP keying material.

Bootstrapping Kerberos

1. Introduction

Kerberos [RFC4120] is a third-party authentication protocol that provides a means of verifying the identities of endpoints of various network applications on an open (unprotected) network by using shared secret key cryptography. Extensions to Kerberos can provide for the use of public key cryptography during certain phases of the authentication protocol [RFC4556].

EAP (Extensible Authentication Protocol) is an authentication protocol which supports multiple authentication algorithms known as "EAP methods" [RFC3748]. The applicability of EAP is, however, for network access authentication. EAP is not designed for providing authentication for various network applications.

For reference, Table 1, below, is a chart that highlights some of the differences between Kerberos and EAP.

TABLE 1

(Comparison of Kerberos vs. EAP)

|  | Kerberos | EAP |
| --- | --- | --- |
| Authentication methods | Only a few authentication methods are currently supported | Support a number of authentication methods |
| Applicability | Applicable to any network application | Applicable to network access authentication |

There is an emerging need for single sign-on in which an initial authentication for network access in a visited or a home domain can provision session keys to multiple different protocols used within the domain, ranging from link-layer to application-layer protocols.

Especially, provisioning session keys to link-layer protocols can optimize link-layer handover performance by eliminating EAP signaling for every handover within the domain, including intra-authenticator and inter-authenticator handovers.

This section describes a mechanism to bootstrap Kerberos from EAP in which EAP is used for initial network access authentication and Kerberos is used for provisioning session keys to multiple different protocols. This section makes use of EAP-EXT methodology to realize the mechanism.

2. Review of the EAP-EXT

According to some preferred embodiments, a new capability is defined within the EAP-EXT methodology (described above), involving a new capability bit for Kerberos.

These embodiments define a new capability bit (K) in a Capabilities field and also new TLVs (e.g., KRB-BOOT TLV and KRB-MSG TLV) of EAP-EXT. In the preferred embodiments, this new capability bit (K) and these new TLVs are employed in the following manner.

In the EAP-EXT exchange, the peer and server set the K-bit in Capabilities field if they want to use functionality (such functionality referred to herein as BKE). If both the peer and the server set the K-bit with an AUTH TLV set, then, in the preferred embodiments, the system employs additional EAP-EXT exchanges in the following way.

The server first sends Kerberos bootstrapping parameters to the peer. Preferably, the Kerberos bootstrapping parameters are contained in a Kerberos-Boot (KRB-BOOT) TLV. The peer then sends a Kerberos AS-REQ message to the server, where the AS-REQ message is contained in a Kerberos-Message (KRB-MSG) TLV. The server then forwards the AS-REQ message to the Kerberos KDC (Key Distribution Center). Then, the KDC returns an AS-REP to the server, where this part of signaling is performed outside EAP-EXT. The server forwards the AS-REP to the peer, where the AS-REP is contained in a KRB-MSG TLV.

Finally, the peer sends a confirmation to the server and the server sends an EAP-Success or a EAP-Failure message to the peer. In the preferred embodiments, all of these exchanges need to be protected with an AUTH TLV.

The manner in which Kerberos is used after it is bootstrapped from EAP can be determined by those in the art based on circumstances, and details related thereto are not required for purposes herein.

FIG. 1 shows an example of EAP-EXT message sequence with BKE.

3. New Message Format

According to the preferred embodiments, as indicated above, a new bit in Capabilities flag of EAP-EXT is defined—i.e., a new K bit.

With reference to FIG. 4, changes to the EAP-EXT message format according to the preferred embodiments herein are depicted.

This K bit indicates support for bootstrapping Kerberos from EAP (referred to herein as BKE). In the preferred embodiments, once both the peer and the server set the K-bit with an AUTH TLV set, then additional exchanges are performed within EAP-EXT in the manner as described above.

4. New Keys

In the preferred embodiments, one new key is defined in order to provide functionality described herein. This new key is referred to as EAP-KRB-KEY. EAP-KRB-KEY is used as the pre-shared key required by Kerberos. In the preferred embodiments, the length and lifetime of ERP-KRB-KEY is communicated from the server to the peer within EAP-EXT—e.g., the length of ERP-KRB-KEY is negotiated within EAP-EXT. In the preferred embodiments, the EAP-KRB-KEY key is derived from the EMSK exported from EAP-EXT using the USRK derivation algorithm defined in, e.g., reference [I-D.salowey-eap-emsk-deriv] incorporated by reference above as follows.

EAP-KRB-KEY=KDF (EMSK, "EAP-EXT-Kerberos-Bootstrapping-Key", length)

In KDF, EAP-EXT-KRB uses the default PRF specified in [I-D.salowey-eap-emsk-deriv].

5. New EAP-EXT TLVs

According to the preferred embodiments, the following new TLVs are defined.

5.1. Kerberos-Boot (KRB-BOOT) TLV

According to the preferred embodiments, a new Kerberos-Boot TLV (Type 6) is established that contains Kerberos bootstrapping parameters. In the preferred embodiments, the following Kerberos bootstrapping parameters are contained in the order of appearance:

a) EAP-KRB-KEY length (2 octets)

In the preferred embodiments, this field indicates the length of EAP-KRB-KEY in octets.

b) EAP-KRB-KEY Lifetime (2 octets)

In the preferred embodiments, this field indicates the lifetime of EAP-KRB-KEY in seconds. The lifetime needs to exceed the lifetime of EMSK.

c) Principal Name (Variable Length)

In the preferred embodiments, this field contains a Kerberos principal name of the peer, encoded by DER (Distinguished Encoding Rules) of ASN.1 (Abstract Syntax Notation One). The Distinguished Encoding Rules of ASN.1 is an International Standard drawn from the constraints placed on basic encoding rules (BER) encodings by X.509. Abstract Syntax Notation One (ASN.1) defines the following rule sets that govern how data structures that are being sent between computers are encoded and decoded: Basic Encoding Rules (BER); Canonical Encoding Rules (CER); Distinguished Encoding Rules (DER); and Packed Encoding Rules (PER). The original rule set was defined by the BER specification. CER and DER were developed later as specialized subsets of BER. PER was developed in response to criticisms about the amount of bandwidth required to transmit data using BER or its variants. PER provides a significant savings. DER was created to satisfy the requirements of the X.509 specification for secure data transfer. For example, the Certificate Enrollment API uses DER exclusively. For reference, see International Telecommunication Union, Information Technology—ASN.1 Encoding Rules—Specification of Basic Encoding Rules (BER), Canonical Encoding Rules (CER), and Distinguished Encoding Rules (DER), ITU-T Recommendation X.690, July 2002, the entire disclosure of which is incorporated herein by reference.

d) Realm (Variable Length)

In the preferred embodiments, this field contains a Kerberos realm of the peer and the KDC, encoded by DER (Distinguished Encoding Rules) of ASN.1 (Abstract Syntax Notation One).

e) IP Address Length (1 octet)

In the preferred embodiments, this field contains the length of KDC's IP address.

f) IP Address of KDC (4 or 16 octets)

In the preferred embodiments, this field contains a binary-encoded IP address of KDC. If the IP address length is 4, it preferably contains an IPv4 address. If the IP address length is 16, it preferably contains an IPv6 address.

5.2. Kerberos-Message (KRB-MSG) TLV

In the preferred embodiments, the Kerberos-Message TLV (Type 7) contains a Kerberos message (e.g., DER-encoded messages), such as AS-REQ and AS-REP messages.

6.0 Illustrative Message Exchange Sequences

FIGS. 5 to 9 show some illustrative message exchange sequences, depicting illustrative communications between components or modules.

In this regard, FIGS. 5 to 7 show message sequences according to some illustrative embodiments employing BKE functionality. Here, FIG. 5 shows message sequences between a client/peer 10, a server 30 and a Key Distribution Center (KDC) 40, and FIGS. 6 and 7 show message sequences between a client/peer 10, a server 30, an authenticator 20 and a KDC (40).

In this regard, the client/peer 10 can, in the preferred embodiments, be contained in a mobile node or device, such as, e.g., a cellular telephone, a personal computer, a laptop computer, a wearable computer, a PDA, etc. In this regard, the client/peer 10 can include functionality of an EAP peer (represented in green in FIGS. 6 and 7) and a Kerberos client (represented in red in FIGS. 6 and 7).

As shown in FIG. 5, communication as between a client/peer 10, a server 30 and a key distribution center (KDC) 40 can be as follows in some embodiments employing BKE.

First, as shown at a) in FIG. 5, the server 30 can optionally transmit an EAP-Request/Identity to the peer 10, and the peer 10 can, as shown at b) in FIG. 5, optionally transmit an EAP-Response/Identity to the server 30.

Next, as shown at c) in FIG. 5, the server 30 transmits an EAP-Request/EXT{Cap.(K), Method} message to the peer 10. Here, Cap. (K) shows that the message has a K-bit of the Capabilities field set, and Method relates to Method TLV. In reply, as shown at d) in FIG. 5, the peer 10 can transmit an EAP-Response/EXT{Cap.(K), Method} message to the server 30.

Next, as shown at e) in FIG. 5, the server 30 transmits an EAP-Request/EXT{Cap.(K), AUTH} message to the peer 10. Here, Cap. (K) shows that the message has a K-bit of the Capabilities field set, and AUTH relates to AUTH TLV. In reply, as shown at f) in FIG. 5, the peer 10 can transmit an EAP-Response/EXT{Cap.(K), AUTH} message to the server 30.

Next, as shown at g) in FIG. 5, the server 30 transmits an EAP-Request/EXT{Cap.(K), KRB-BOOT, AUTH} message to the peer 10. Here, Cap. (K) shows that the message has a K-bit of the Capabilities field set, KRB-BOOT relates to the Kerberos Boot TLV (which includes Kerberos bootstrapping parameters), and AUTH relates to AUTH TLV. In reply, as shown at h) in FIG. 5, the peer 10 can transmit an EAP-Response/EXT{Cap.(K), KRB-MSG, AUTH} message to the server 30. Here, a AS-REQ message is contained in the Kerberos-Message TLV (KRB-MSG).

As shown at l) in FIG. 5, the server 30 also transmits the Kerberos bootstrapping parameters to the KDC.

In addition, as shown at m) in FIG. 5, the server 30 then forwards the AS-REQ message to the Kerberos KDC (Key Distribution Center). Then, as shown at n) in FIG. 5, the KDC returns an AS-REP message to the server, where this part of signaling is performed outside EAP-EXT.

Next, as shown at i) in FIG. 5, the server 30 forwards the AS-REP to the peer 10, where the AS-REP is contained in a KRB-MSG TLV. In that regard, the server 30 transmits at i) an EAP-Request/EXT{Cap.(K), KRB-MSG, AUTH} message as shown.

Finally, the peer sends a confirmation to the server and the server sends an EAP-Success or an EAP-Failure message to the peer. Here, preferably, as shown at j) in FIG. 5, the peer 10 sends an EAP-Response/EXT {Cap.(K), AUTH} message to the server 30, and the server 30 sends an EAP-Success message to the peer 10.

In the preferred embodiments, all of these exchanges need to be protected with an AUTH TLV.

With reference to FIG. 6, this figure is substantially similar to the message sequence shown in FIG. 5. However, FIG. 6 further depicts message exchange in relation to the authenticator 20. In this regard, after step j) shown in FIG. 5, as shown at x) in FIG. 6, the server transmits the MSK to the authenticator 20, and then at y), a Secure Association is established between the peer/client and the authenticator.

FIG. 7 is another message sequence according to some illustrative embodiments employing BKE functionality, further including TGS-REQ/REP. For background reference, in Kerberos, a client asks a Ticket Granting Server (TGS) for a ticket needed for communicating with an application server. The ticket generated by the TGS includes the identity of the client and a session key, all encrypted in the application server's key. The TGS returns the ticket and a copy of the session key to the client, all encrypted in the client's key. However, this exchange does not by itself provide any assurance of the identity of the client. Assurance of the identity of the client is made by another exchange between the client and application server based on verifying the ticket. The TGS agrees on the client's identity by issuing the ticket. The client and application server agree on the client's identity by verifying the ticket issued by the TGS. The three-party agreement on the client identity is made securely based on cryptographic proof of possession of the session key between the client and application server, where the ticket has the binding between the session key and client's identity.

With reference to FIG. 7, as shown at x1), the peer 10 transmits a message to the server 30 of a format EAP-Response/EXT {F, KRB-MSG (TGS-REQ), AUTH}, and as shown at x2), the server 30 transmits a TGS-REQ to the KDC. Then, the KDC returns a TGS-REP as shown at y2) in FIG. 7. Next, the server 30 transmits a message to the peer 10 of a format EAP-Request/EXT {F, KRB-MSG (TGS-REP), AUTH}. Then, the peer transmits the EAP-Response/EXT {F, AUTH} similar to that described above.

For reference, FIG. 8 is provided which depicts an illustrative Kerberos message sequence involving an Application Client (C), an Application Server (S), and a Key Distribution Center (KDC), wherein the KDC includes a Ticket Granting Server (TGS) and an Authentication Server (AS). In this illustrative example, three message exchange steps are shown: a) step S1 of the sequence involves presenting authenticator and getting TGT (in this regard, as shown at 100, an AS_REQ message is transmitted to the Authentication Server (AS) and, as shown at 110, an AS_REP message is transmitted from the Authentication Server); b) step S2 of the sequence involves presenting TGT and getting a ticket (in this regard, as shown at 120, a TGS_REQ message is transmitted to the Ticket Granting Server (TGS) and, as shown at 130, a TGS_REP message is transmitted from the TGS Server);

For reference, FIG. 9 depicts an illustrative EAP message sequence involving a peer, an authenticator and a server. In the figure, message 200 depicts an EAP-Request from the server, message 201 depicts an EAP-Response from the peer, message 202 depicts an EAP-Success message from the server, message 203 depicts an MSK message from the server, and 204 depicts a Secure Association (lower-layer) established. Here, the Authenticator provides network access service to Peer. In some embodiments, the Authenticator and Server may be implemented on the same device, while in some embodiments, the Authenticator and Server can be implemented on separated devices. When implemented on separated devices, the Authenticator acts as a "pass-through" forwarder of EAP messages between the Peer and the Server.

REFERENCES

The following background references are incorporated herein by reference in their entireties.
1. Bradner, S., "Key words for use in RFCs to Indicate Requirement Levels", BCP 14, RFC 2119, March 1997 (Referred to herein as [RFC2119]).
2. Aboba, B., Blunk, L., Vollbrecht, J., Carlson, J., and H. Levkowetz, "Extensible Authentication Protocol (EAP)," RFC 3748, June 2004 (Referred to herein as [RFC3748]).
3. Aboba, B., "Extensible Authentication Protocol (EAP) Key Management Framework", draft-ietf-eap-keying-16 (work in progress), January 2007 (Referred to herein as [I-D.ietf-eap-keying]); and [I-D.ietf-eap-keying] Aboba, B., "Extensible Authentication Protocol (EAP) Key Management Framework", draft-ietf-eap-keying-15 (work in progress), October 2006.
4. Narayanan, V. and L. Dondeti, "Problem Statement on EAP Efficient Re-authentication and Key Management", draft-vidya-eap-reauth-ps-00 (work in progress), October 2006 (Referred to herein as [I-D.vidya-eap-reauth-ps]).
5. Ohba, Y., "Channel Binding Mechanism based on Parameter Binding in Key Derivation", draft-ohba-eap-channel-binding-02 (work in progress), December 2006 (Referred to herein as [I-D.ohba-eap-channel-binding]).
6. Salowey, J., "Specification for the Derivation of Usage Specific Root Keys (USRK) from an Extended Master Session Key (EMSK)", draft-salowey-eap-emsk-deriv-01 (work in progress), June 2006 (Referred to herein as [I-D.salowey-eap-emsk-deriv]).
7. National Institute of Standards and Technology, "Secure Hash Standard", August 2002 (Referred to herein as [sha256]).
8. Arkko, J. and P. Eronen, "Authenticated Service Information for the Extensible Authentication Protocol (EAP)", tools.ietf.org/html/draft-arkko-eap-service-identity-auth-04, October 2005 (Referred to herein as [arkko-eap-service-identity-auth]).
9. Kaufman, C., "Internet Key Exchange (IKEv2) Protocol", RFC 4306, December 2005 (Referred to herein as [RFC4306]).
10. Narayanan, V. and L. Dondeti, "EAP Re-authentication Extensions", draft-ietf-hokey-erx-02 (work in progress), July 2007 (Referred to herein as [I-D.ietf-hokey-erx]).
11. Salowey, J., "Specification for the Derivation of Root Keys from an Extended Master Session Key (EMSK)", draft-ietf-hokey-emsk-hierarchy-01 (work in progress), June 2007 (Referred to herein as [I-D.ietf-hokey-emsk-hierarchy]).
12. Neuman, C., Yu, T., Hartman, S., and K. Raeburn, "The Kerberos Network Authentication Service (V5)", RFC 4120, July 2005 (Referred to herein as [RFC4120]).
13. Zhu, L. and B. Tung, "Public Key Cryptography for Initial Authentication in Kerberos (PKINIT)", RFC 4556, June 2006 (Referred to herein as [RFC4556]).

While a variety of systems and methods are known, there remains a need for improved systems and methods.

SUMMARY

The present invention improves upon existing systems and methods, including systems and methods described above.

According to some preferred embodiments, a media-independent handover key management architecture is described that uses Kerberos for secure key distribution among a server, an authenticator, and a mobile node. With this architecture, in the preferred embodiments, signaling for key distribution is based on re-keying and is decoupled from re-authentication that requires EAP (Extensible Authentication Protocol) and AAA (Authentication, Authorization and Accounting) signaling similar to initial network access authentication. In this framework, the mobile node is able to obtain master session keys required for dynamically establishing the security associations with a set of authenticators without communicating with them before handover. By separating re-key operation from re-authentication, the proposed architecture is more optimized for a proactive mode of operation. It can also be optimized for reactive mode of operation by reversing the key distribution roles between the mobile node and the target access node.

According to some preferred embodiments, a system and/or method for media-independent handover key management for secure key distribution among a server, an authenticator and a mobile node employing Kerberized Handover Keying, comprising: a) having a mobile node transmit an AS-REQ to a Key Distribution Center, and having the mobile node receive an AS-REP from the Key Distribution Center with a Ticket Granting Ticket; b) having the mobile node discover at least one authenticator; c) having the mobile node transmit a TGS-REQ to the Key Distribution Center, and having the mobile node receive a TGS-REP from the Key Distribution Center to obtain a ticket for the at least one authenticator; d) during handover to a target authenticator of the at least one authenticator, having the mobile node transmit an AP-REQ to the target authenticator. In some examples, the method further includes having the mobile node transmit an AP-REQ to the target authenticator having the target authenticator transmit an AP-REP message to the mobile node. In some examples, the method further includes having the mobile node exchange at least one KRB-SAFE message or link-layer specific SAP messages with the target authenticator to establish a link-layer security association between the mobile node and the authenticator. In some examples, the method includes having authorization information embedded in ticket authorization data such that the target authenticator performs access control without AAA signaling after handover for authorization.

According to some other embodiments, a media-independent handover key management architecture for secure key distribution among a server, an authenticator and a mobile node, is provided that includes: a mobile node having an EAP peer that is configured to communicate with an EAP server; the mobile node further having a Kerberos client or server that is configured to communicate with at least one authenticator for at least one target network that has a respective Kerberos client or server; and the mobile node being configured to perform security signaling during handover to the at least one target network via the at least one authenticator, including network access authentication and key management signaling to obtain master session keys using Kerberos to dynamically establish a security association via the at least one authenticator without re-authentication using EAP and AAA signaling. In some examples, the mobile node has a Kerberos client. In some examples, the at least one authenticator includes a plurality of authenticators and the mobile node is configured to proactively obtain per-authenticator keys for the plurality of authenticators. In some examples, the plurality of authenticators includes at least one access point or base station.

According to some other embodiments, a system and/or method for media-independent handover key management for secure key distribution among a server, an authenticator and a mobile node includes: a) having a mobile node obtain the identity of a Key Distribution Center and a secret key shared with an Application Server during initial network access authentication via bootstapping Kerberos from network access authentication credentials using an EAP method; and b) having the mobile node establish security associations with a set of authenticators using Kerberos prior to handover. In some examples, the method includes having the mobile node include a Kerberos client that communicates with respective Kerberos servers of the authenticators. In some examples, the method includes delivering a Ticket Granting Ticket to an authenticator prior to handover of the mobile node thereto. In some examples, for the bootstrapping, an EAP server and the Key Distribution Center are implemented on the same node using a same identifier for the EAP server identity and the Key Distribution Center.

The above and/or other inventions, aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIGS. 5 and 6 show message sequences according to some illustrative embodiments of BKE functionality, wherein FIG. 5 shows message sequences between a client/peer, a server and a KDC, and FIG. 6 shows message sequences between a client/peer, a server, an authenticator and a KDC;

FIG. 19 is a diagram depicting some illustrative architectural components that may be employed within devices according to some embodiments;

PREFERRED EMBODIMENTS OF THE INVENTION

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Kerberized Handover Keying Overview:

Kerberos Usage for Handover Keying.

According to some preferred embodiments of the present invention, Kerberos usage for handover keying is employed. In this regard, Kerberos can be made available to handover key management by, e.g., placing a Kerberos application server on each network point of attachment (PoA) (e.g., access points, base stations and/or access routers).

Among other things, this implementation can achieve the following and/or other advantages and benefits:

a) authentication signaling using EAP/AAA can be eliminated for every handover within a Kerberos realm; and b) the same framework is applicable to bootstrap any protocol used at any layer—such as, e.g., for FMIPv6, HMIPv6, DHCP authentication, etc.

Kerberized Handover Keying Steps.

According to some illustrative embodiments of the present invention, with reference to FIG. 10, Kerberos handover keying can employ the following steps.

Figure 10A:
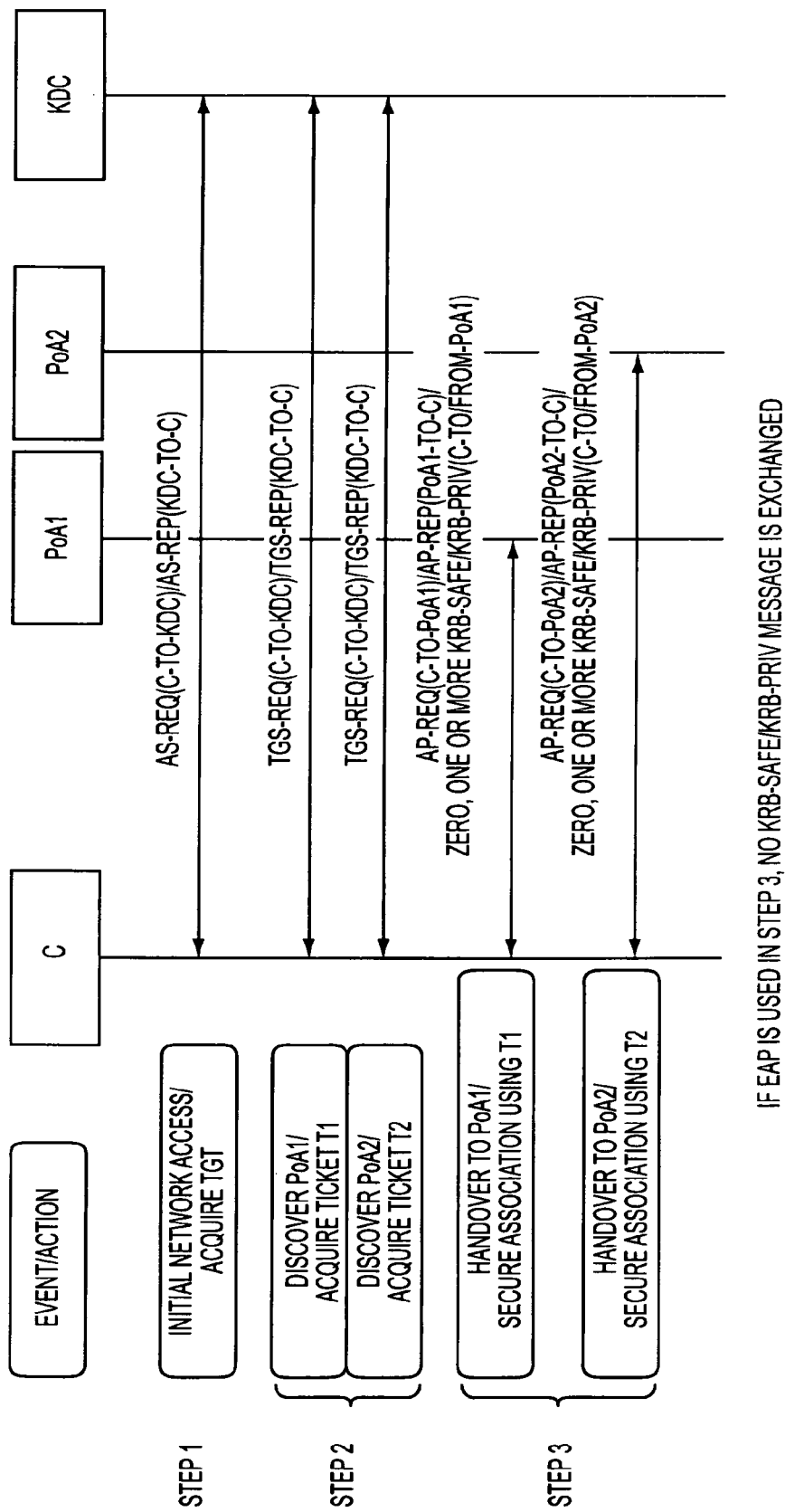
FIG. 10(A) is a diagram showing Kerberized Handover Keying message sequence according to some embodiments of the invention.

In the embodiment shown in FIG. 10(A), a first step, Step 1, involves the acquisition of a Ticket Granting Ticket (TGT) at the time of initial network access authentication via the initial Point-of Attachment (PoA). In this regard, an AS-REQ/AS-REP exchange can be used and transported over TCP or UDP as specified in RFC 4120 (i.e., Neuman, C., Yu, T., Hartman, S., and K. Raeburn, "The Kerberos Network Authentication Service (V5)", RFC 4120, July 2005 incorporated herein by reference above) or over EAP-EXT with BKE (Bootstrapping Kerberos from EAP as described above). As shown, the AS-REQ would be transmitted from the Application Client C (e.g., within a mobile device or node) to the Key Distribution Center (KDC).

Figure 9:
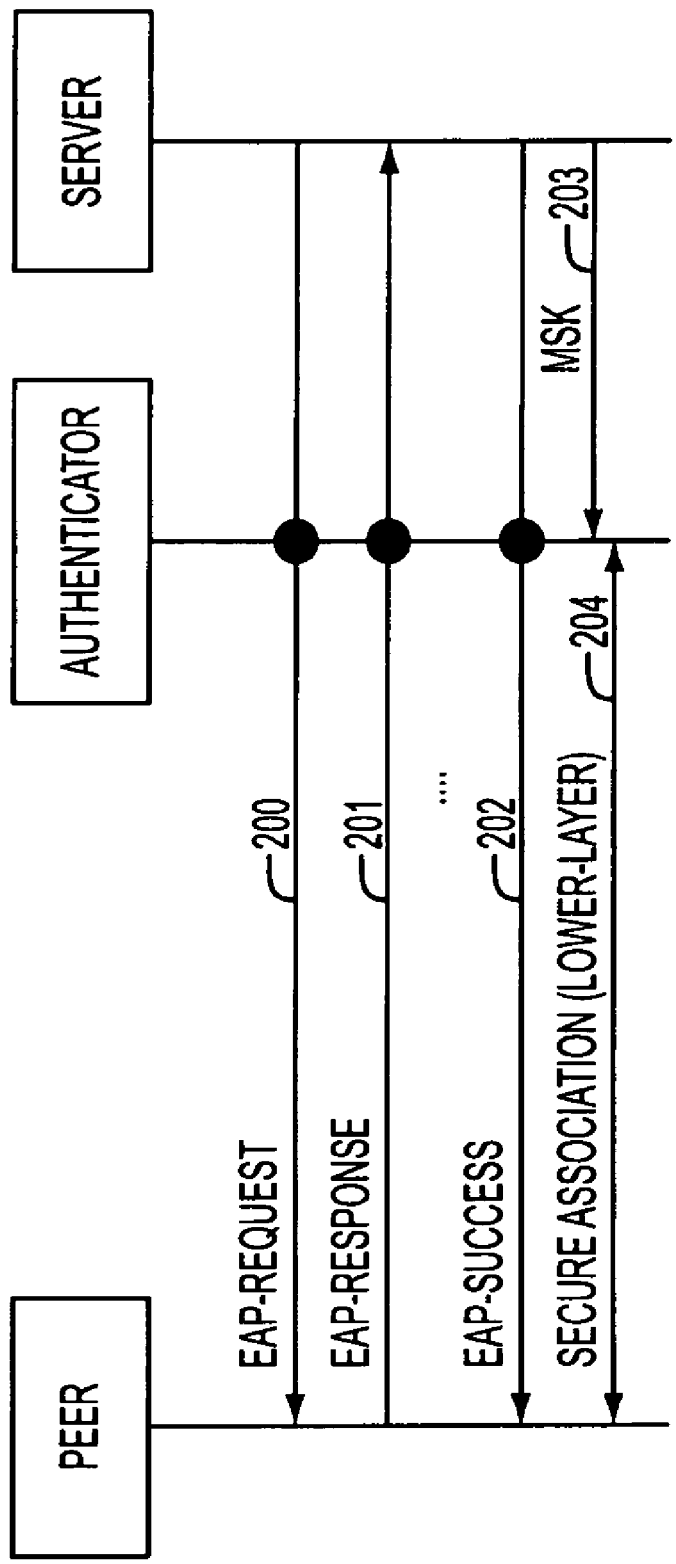
FIG. 9 is a background diagram depicting EAP message sequencing for reference.

In the embodiment shown in FIG. 10(A), a second step, Step 2, involves a proactive per-PoA ticket acquisition for each candidate PoA. In this regard, a TGS-REQ/TGS-REP exchange is used and transported over TCP or UDP as specified in RFC 4120 or over EAP-EXT, as described above. In such cases, the client C obtains a ticket for each PoA to which it may handover. For example, FIG. 9 shows an illustrative case example in which a client C discovers a first point of attachment PoA1 and acquires a ticket T1 related thereto and wherein the client C discovers a second point of attachment PoA2 and acquires a ticket T2 related thereto. As shown, for each point of attachment, a TGS-REQ would be transmitted from the Application Client C to the Key Distribution Center (KDC), and a TGS-REP would be transmitted from the Key Distribution Center (KDC) to the Application Client C.

In the embodiment shown in FIG. 10(A), a third step, Step 3, involves establishing a secure association to the target PoA(s) using the acquired ticket(s).

In this Step 3, an AP-REQ/AP-REP exchange optionally followed by KRB-SAFE or KRB-PRIV exchanges can be used and transported over TCP or UDP as specified in RFC 4120, or over the link-layer if there is no IP connectivity. In cases where these messages are carried over the link-layer, they can be carried in EAP messages by defining: a) a new EAP authentication method for supporting Kerberos exchange, or b) a new EAP Code for supporting Kerberos exchange. Otherwise, media-specific information is carried in KRB-SAFE or KRB-PRIV exchanges.

In this Step 3, some part of secure association signaling can be proactively performed before handover. For example, an AP-REQ/AP-REP exchange can be performed before handover to create a cache of session keys at candidate PoAs.

PoA Discovery.

In order to acquire a per-PoA ticket in Step 2, as discussed above, PoAs need to be discovered to get per-PoA ticket in Step 2. In this regard, in order to carry out PoA discovery IEEE 802.21 Information Service can be employed. See, e.g., I.E.E.E. P802.21™/D04.00, February 2007 entitled Draft Standard for Local and Metropolitan Area Networks: Media Independent Handover Services, the entire disclosure of which is incorporated herein by reference as though recited herein in full.

Key Lifetime.

It is noted that a ticket carries a lifetime. In this regard, this lifetime determines the (sub) session key lifetime. Here, the lifetime of the (sub) session key needs to be no longer than the ticket lifetime.

Authorization.

According to some preferred embodiments, authorization information can be contained in a ticket. In this regard, the lifetime of tickets (including TGTs) needs to be no longer than the AAA authorization lifetime. Here, the Authenticator does not require AAA signaling for authorization signaling if a ticket contains such authorization information. Otherwise, AAA signaling for authorization should be performed.

Re-Keying.

According to some preferred embodiments, re-keying of link-layer cipher keys can be performed without EAP re-authentication all the way to the home AAA server. For example, this can be achieved by re-issuing a new ticket in Step 2 and then performing Step 3, as described above.

Re-Authentication.

In some cases, EAP re-authentication is needed if the authorization lifetime needs to be extended. In some preferred embodiments, this can be achieved with re-issuing a new TGT and then re-issuing per-PoA tickets.

Inter-AAA Domain Operation.

With respect to Inter-AAA Domain Operation, Kerberos advantageously allows cross-realm operation. In addition, one can form a Kerberos realm (or realms) per an AAA domain.

For cross realm/domain operation, the client needs to obtain a TGT from its local AS used for a visited realm/domain.

Initial Entry Issue.

According to some preferred embodiments, the initial PoA acts as EAP authenticator for BKE. In some examples, the initial PoA can use an EAP MSK to generate a PMK. This should be used if the initial PoA does not support Kerberos. In some alternative examples, the initial PoA can use a Kerberos ticket to generate a PMK by executing Step 3 after successful EAP authentication. In this latter case, not only Step 1, but also Step 2 needs to be performed within BKE. In addition, a successful EAP authentication itself does not trigger secure association in this latter case. This should be used if the initial PoA supports Kerberos.

Kerberized Handover Keying Optimized for Reactive Operation.

Figure 10B:
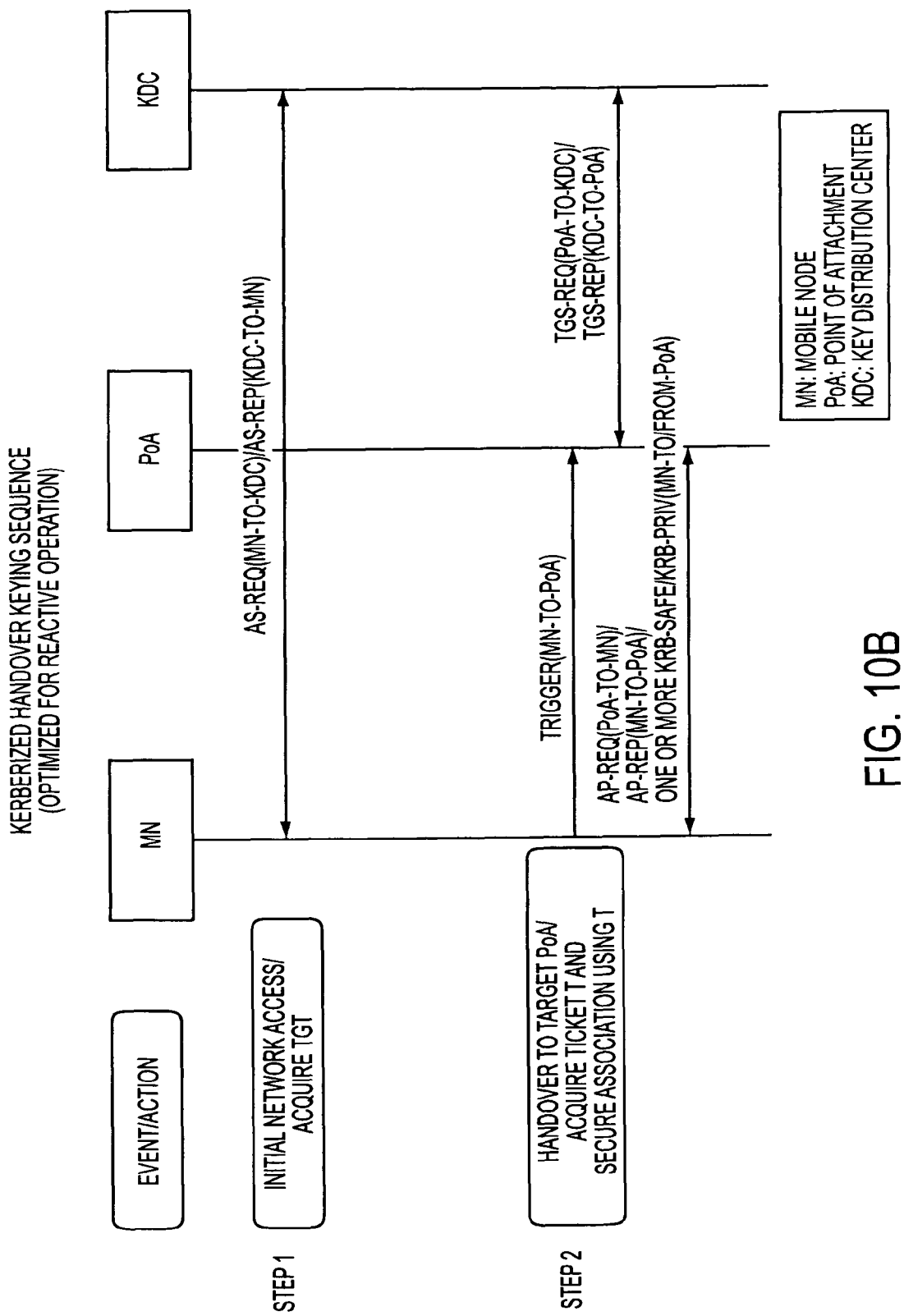
FIG. 10(B) is a diagram showing Kerberized Handover Keying message sequence according to some embodiments of the invention that are optimized for reactive operation.

According to some alternative embodiments, Kerberized Handover Keying can be modified so as to be optimized for reactive operation. In this regard, in some embodiments, the Kerberized Handover Keying steps described above with reference to FIG. 10(A) can be modified. For example, in some illustrative embodiments, as shown in FIG. 10(B), the following steps can be employed.

A first Step 1 can involve Ticket Granting Ticket (TGT) acquisition at the time of initial network access authentication via the initial point of attachment (PoA). This can be performed in the same way as the normal operation described above in reference to FIG. 10(A).

A second Step 2 can involve a reactive per-PoA ticket acquisition for a target PoA and a secure association to target PoA using the ticket. In this regard, the mobile node (MN) can send a Trigger message to the target PoA or the target PoA can find the mobile node via link-layer indicates. In the reactive operation embodiments, the target PoA acts as a Kerberos client and initiates TGS-REQ/TGS-REP exchange to obtain a ticket for the mobile node. After the target PoA obtains the ticket for the mobile node, it initiates AP-REQ/AP-REP exchange with the mobile node (for ticket installation), followed by KRB-SAFE or KRB-PRIV exchanges (for media-specific information exchange).

Additional Discussion Related to Some Preferred Embodiments

This section further describes exemplary embodiments of a media-independent handover key management architecture that uses Kerberos for secure key distribution among a server, an authenticator, and a mobile node. With this architecture, signaling for key distribution is based on re-keying and is decoupled from re-authentication that requires EAP (Extensible Authentication Protocol) and AAA (Authentication, Authorization and Accounting) signaling similar to initial network access authentication. In this framework, the mobile node is able to obtain master session keys required for dynamically establishing the security associations with a set of authenticators without communicating with them before handover. By separating re-key operation from re-authentication, the proposed architecture is more optimized for a proactive mode of operation. It can also be optimized for reactive mode of operation by reversing the key distribution roles between the mobile node and the target access node. This section also shows how this present architecture is applicable to the existing link-layer technologies (including, e.g., IEEE 802.11 and 802.16) and across multiple AAA domains. This section also further describes how Kerberos can be bootstrapped from initial access authentication using an EAP method.

1. Introduction.

Figure 11:
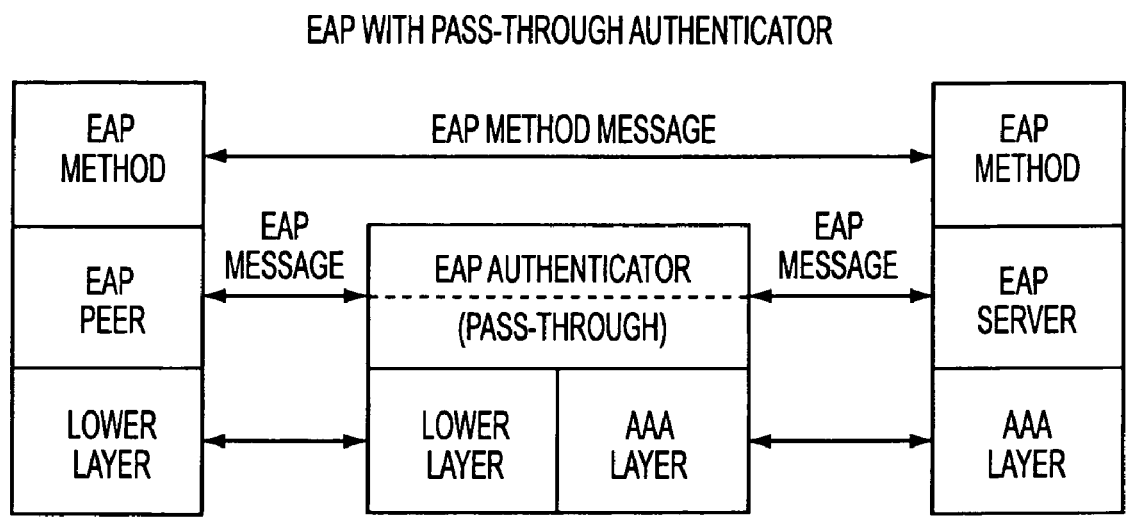
FIG. 11 is a diagram showing EAP functionality and EAP with a pass-through authenticator.

Wireless network technologies are evolving to allow seamless handover across multiple different link-layer technologies. For example, I.E.E.E. 802.21 (see reference [1] below) is defining a Media-Independent Handover (MIH) Function with unified interface to both link-layer and higher-layer protocols. This function facilitates handover by providing several services to a mobility management entity and a protocol for carrying these services to another MIH Function in a remote node. While security signaling optimization during handover is one of the important factors for achieving seamless handover, it is currently outside of the scope of the I.E.E.E. 802.21 specification. Security signaling during handover includes network access authentication and subsequent key management signaling for enabling link-layer ciphering. The IETF (Internet Engineering Task Force) defines EAP (Extensible Authentication Protocol) (see reference [2] below) that provides a unified mechanism for network access authentication with a support of a variety of authentication methods over several link-layer technologies such as, e.g., Ethernet, I.E.E.E. 802.11 and I.E.E.E. 802.16 (see, e.g., references [3], [4] and [5] below) as well as over UDP/IP (see, e.g., references [6] and [7] below). As described above, an EAP method is a two-party authentication protocol that runs an authentication method between a peer (e.g., a mobile node) and a server (e.g., a backend authentication server), whereas EAP is just a container for conveying the EAP method through an authenticator (e.g., an access point in case of I.E.E.E. 802.11) as shown in FIG. 11: EAP with pass-through authenticator.

Although EAP provides a media-independent mechanism for network access authentication, its basic design has not sufficiently taken into account to optimize its signaling when the peer changes one authenticator to another one due to a handover, except for specific EAP methods that address this issue by providing enhancements using session resumption to address this issue (see, e.g., reference [8] below). However, such enhancements are not usable when other EAP methods are used for initial network access authentication.

The IETF has recently started the HOKEY (Handover Keying) working group to define mechanisms and protocols for optimizing EAP for handover (see, e.g., reference [9] below). The HOKEY working group is defining three components, such as low-latency re-authentication (or HOKEY re-authentication), handover key management, and pre-authentication. HOKEY re-authentication defines an extension to EAP to minimize message roundtrips by utilizing keying material generated by a previous EAP session. Handover key management defines a new key hierarchy that spans multiple authenticators as well as a key distribution mechanism from the server to the authenticators. Pre-authentication is a proactive handover optimization technique by which a peer runs EAP for a candidate target authenticator from the serving access network (see, e.g., reference [10] above).

However, there are two issues on the HOKEY components. First, HOKEY re-authentication still requires a peer to communicate with the server that is typically co-located with an AAA server that resides in the home or a visited operator's network and is likely to be physically away from the peer's location. (Note: An AAA server in the visited operator's network also serves as the home AAA server for subscribers of the operator.) Thus, it is difficult for HOKEY re-authentication to reduce the handover latency to the extent that does not affect the performance of real-time applications. Second, HOKEY pre-authentication requires an accurate anticipation on movement of the mobile node. However, movement anticipation is difficult when there are a number of candidate authenticators in the neighboring networks.

As described above, the preferred embodiments establish a new architecture referred to as Kerberized Handover Keying for handover key management using Kerberos (see, e.g., reference [11] below) in order to, among other things, address the issues on HOKEY.

In preferred embodiments, Kerberized Handover Keying (KHK) provides the following features: a) KHK does not require post-handover AAA signaling for authentication and authorization as long as the mobile node proactively obtains per-authenticator keys; b) the post-handover signaling latency is expected to be reduced to the order of propagation delay within the access network based on a few message exchanges between the peer and the authenticator for Kerberos ticket installation and execution of a lower-layer secure association protocol; and c) KHK can reduce the size of required key cache for proactive keying operation since each authenticator does not need to store a key for a mobile node before handover.

There is an existing work EAP-GSS (see reference [12] below) that uses Kerberos for network access authentication and key management. The work was initially considered as a candidate for I.E.E.E. 802.11i. However, unlike KHK, the work neither considers handover optimization nor allows any EAP method to be used for initial network access authentication.

2. Further Overview of Kerberos.

Figure 12:
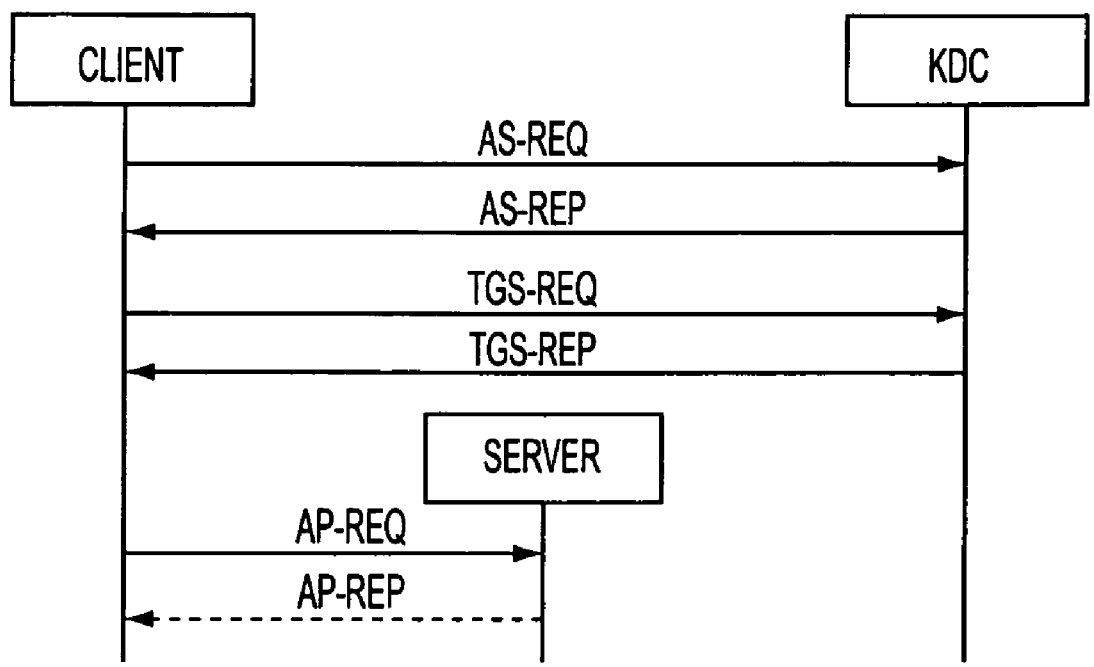
FIG. 12 is a background diagram depicting Kerberos message sequencing similar to that shown in FIG. 8.

Further to the above discussion, Kerberos (see reference [10] below) is a three-party authentication and key management protocol based on symmetric keys. There are three principal components in Kerberos: a Client, a Server, and a Key Distribution Center (KDC). In addition, the KDC provides two special servers: an Authentication Server (AS); and a Ticket Granting Server (TGS). In such cases, it is assumed that each Client and Server has a pre-established trust relationship with the KDC based on a secret key. In Kerberos, a session key that is used by the Client and Server to securely establish a session is generated by the KDC and distributed to the Client. The Client then distributes the session key to the Server using a "ticket," or a record generated by the KDC to help a Client authenticate itself to a server. The ticket contains the identity of the client, a session key, a timestamp and other information, wherein all such pieces of information (except for a ticket version number, a realm and a server name) are encrypted using the server's secret key shared only with the KDC. The Kerberos protocol involves three exchanges where the initial exchange is performed only once. FIG. 12, labeled Kerberos Sequence, shows a typical protocol sequence of Kerberos.

As shown in FIG. 12, in the initial exchange (AS-REQ/AS-REP exchange), the client requests a Ticket Granting Ticket (TGT), or a special ticket used for generating other tickets, from the AS. The AS generates a TGT, which contains a session key for TGS (a TGS session key), and sends the client the TGT together with a copy of the TGS session key that is encrypted with the secret key shared only with the client.

In the second exchange, the TGS-REQ/TGS-REP exchange, the client sends the server's identity and the TGT to the TGS, together with the credentials generated using the TGS session key so that the TGS can verify that the client possesses the same TGS session key. After successful verification of the credentials, the TGS generates a ticket which contains a session key for the server and sends the client the ticket and a copy of the session key that is encrypted with the secret key shared only with the client.

In the third exchange, the AP-REQ/AP-REP exchange, the client sends the ticket obtained in the second exchange, together with the message authentication code computed by the client using the session key so that the server can verify that the client possesses the session key. The AP-REP message may be omitted if the client does not need to authenticate the server. After successful verification of the credentials, the client and server are able to use the session key for protecting their application protocol.

3. Kerberized Handover Keying (KHK).

According to preferred embodiments, Kerberized Handover Keying (KHK) is employed wherein a mobile node and an authenticator (e.g., an access point or a base station) act as a client or a server of Kerberos.

In this regard, the roles of client and server can be reversed depending on the timing when a ticket is delivered to the authenticator. According to some embodiments, a proactive mode is employed in which ticket delivery to the authenticator happens before the handover. On the other hand, according to other embodiments, a reactive mode is employed in which ticket delivery to the authenticator happens after the handover.

The proactive mode embodiments are more optimized than the reactive mode embodiments since the proactive mode does not require that a mobile node communicate with the KDC after handover. In such cases, the signaling latency after handover should, in some embodiments, be similar to that for I.E.E.E. 802.11i 4-way handshake (see reference [4] below) and is known in some examples to be less than 20 msec (see reference [13] below).

With the preferred embodiments, the KHK architecture does not require an authenticator to create any state for a mobile node before handover, even in proactive mode. In the preferred embodiments, initially, the mobile node obtains the identity of the KDC and the secret key shared with the AS during initial network access authentication by using the bootstrapping mechanism as described below in Section 4. After initialization, the three steps of Kerberos explained in Section 2 above are executed. The three steps are executed differently in proactive and reactive modes; details of these differences are explained in Sections 3.1 and 3.2.

3.1 Proactive Mode

Figure 13:
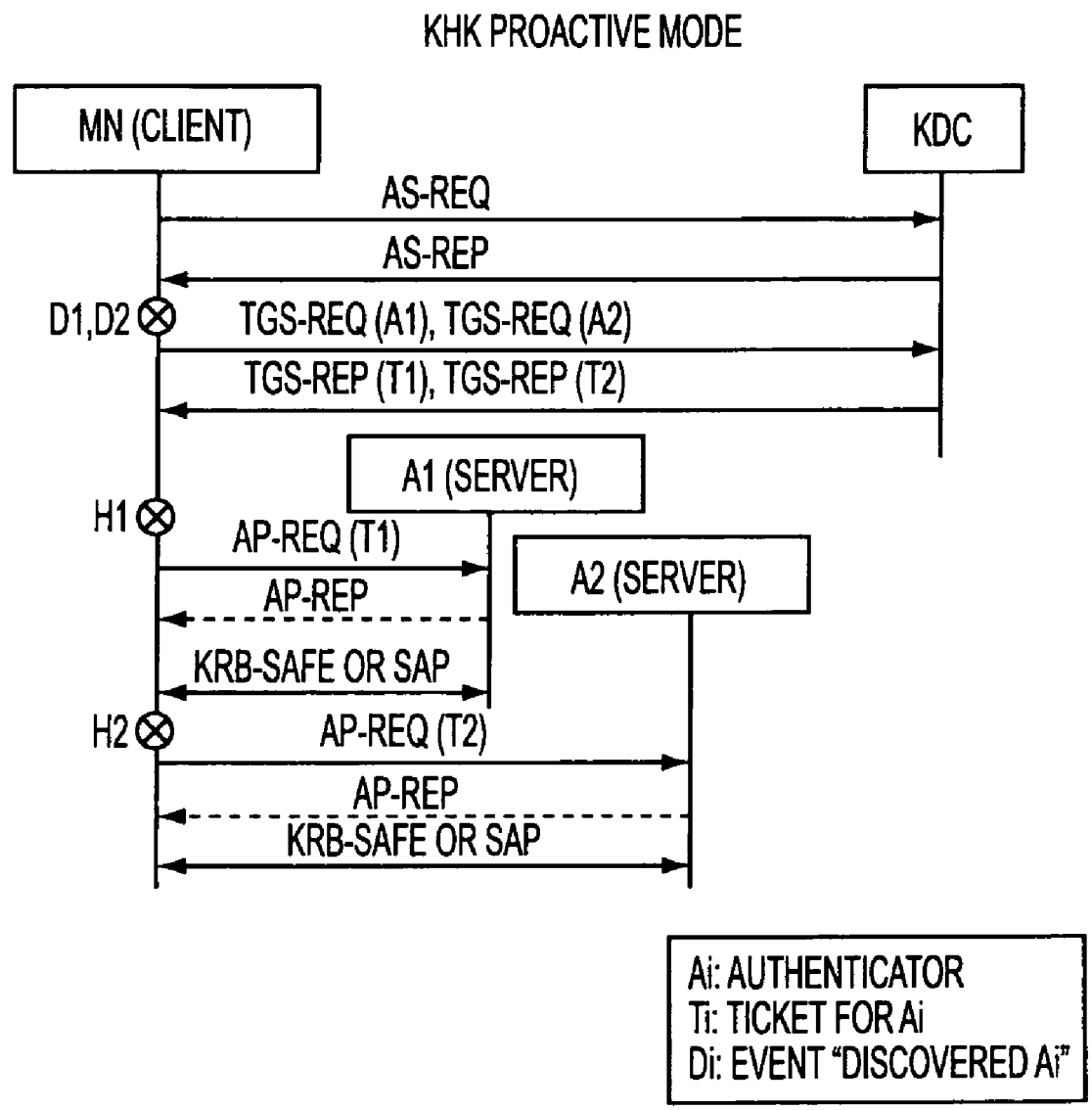
FIG. 13 is a diagram depicting Kerberos Handover Keying message sequencing according to some embodiments, similar to that shown in FIG. 10(A), in a proactive mode.

In this section, proactive mode is explained in reference to FIG. 13, labeled KHK proactive mode. First, the mobile node (MN) runs an AS-REQ/AS-REP exchange with the KDC to obtain a TGT. When the MN discovers one or more authenticators (e.g., events D1 and D2) by using authenticator discovery mechanisms as described in Section 3.4, it runs a TGS-REQ/TGS-REP exchange with the KDC to obtain a ticket for each discovered authenticator (e.g., A1 and A2). When the MN makes a handover to one of the discovered authenticators (e.g., event H1), it runs an AP-REQ/AP-REP exchange with the authenticator (AP-REP message is optional). When the MN makes another handover to a different authenticator (e.g., event H2), it runs an AP-REQ/AP-REP exchange with the authenticator. In this case, the mobile node and the target authenticator act as a client and a server of Kerberos, respectively.

After the AP-REQ/AP-REP exchange, one or more additional KRB-SAFE messages or link-layer specific SAP (Secure Association Protocol) messages are exchanged between the mobile node and the target authenticator to establish a link-layer security association between the mobile node and the authenticator. These messages carry link-layer specific parameters such as link-layer ciphersuites parameters. The use of KRB-SAFE messages allows the architecture to be independent of link-layer technologies; each link-layer technology only needs to define a Kerberos transport between a mobile node and an authenticator as well as the format and semantics of the link-layer specific parameters to be carried in KRB-SAFE messages. In the case of IEEE 802.11, link-layer authentication frames can be used as the Kerberos transport between a mobile node and an authenticator, and 802.11i 4-way handshake can be used as the SAP instead of KRB-SAFE messages. Similarly, in the case of IEEE 802.16, new PKM (Privacy Key Management) message types can be defined to carry Kerberos messages between a mobile station and a base station, and PKM 3-way handshake can be used as the SAP instead of KRB-SAFE messages. In both of these cases, modifications should be made to the link-layer specifications.

3.2 Reactive Mode

Figure 14:
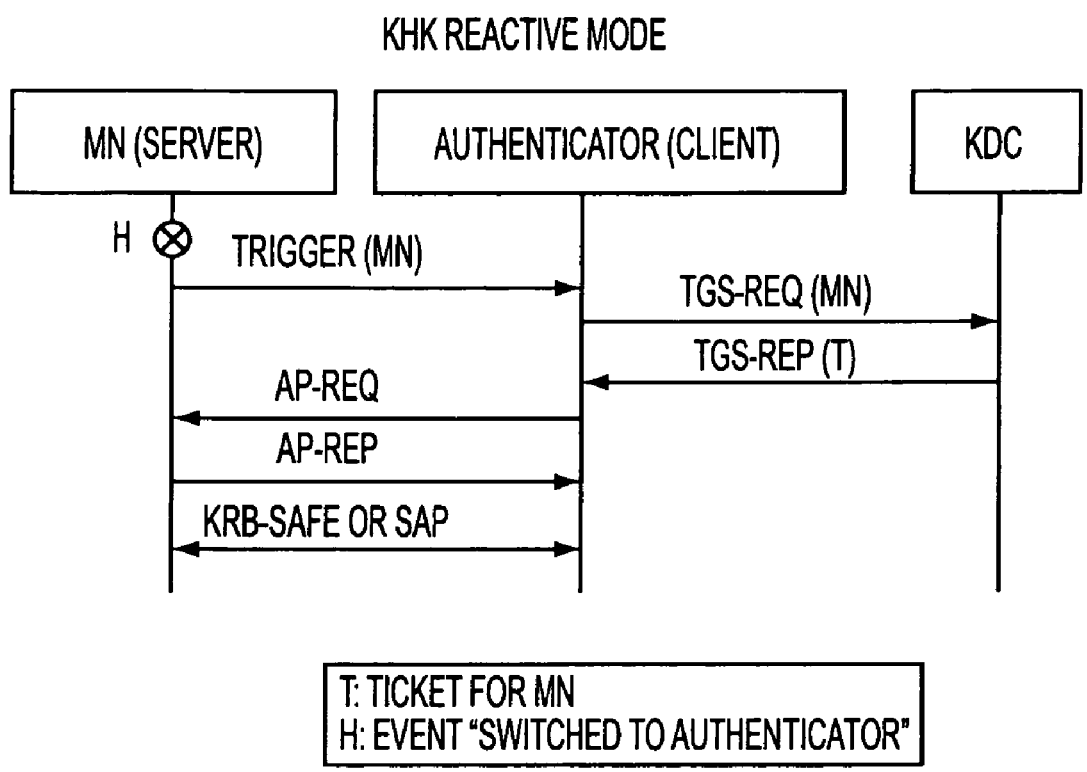
FIG. 14 is a diagram depicting Kerberos Handover Keying message sequencing according to some embodiments, similar to that shown in FIG. 10(B), in a reactive mode.

In this section, reactive mode embodiments are described in reference to FIG. 14, labeled KHK reactive mode.

First, the mobile node (MN) runs an AS-REQ/AS-REP exchange with the KDC to obtain a TGT, in the same way as proactive mode.

In reactive mode, however, the Kerberos roles of the mobile node and the target authenticator are reversed—i.e., the mobile node and the target authenticator act as a server and a client, respectively. Preferably, after a handover to the target authenticator, the mobile node first sends a trigger message to the target authenticator. The target authenticator then runs a TGS-REQ/TGS-REP exchange with the KDC to obtain a ticket for the mobile node and then runs an AP-REQ/AP-REP exchange with the mobile node (AP-REP message is mandatory to authenticate the mobile node (MN) before KRB-safe or SAP exchange).

After the AP-REQ/AP-REP exchange, one or more additional KRB-SAFE messages or link-layer specific SAP (Secure Association Protocol) messages are exchanged between the mobile node and the target authenticator to establish a link-layer security association between the mobile node and the authenticator. This exchange can be performed in a similar fashion as the proactive mode.

Since the trigger message is unprotected, a resource consumption DoS (Denial of Service) attack could be possible for reactive mode. Accordingly, an additional mechanism can be employed to mitigate such a DoS attack.

The signaling latency after handover for reactive mode is expected to be substantially that of the proactive mode plus one round trip between the authenticator and the KDC. Therefore, the handover performance for real-time applications for reactive mode depends on the location of the KDC. As described in Section 3.6 below, the KDC can be placed at a location closer to the authenticators using cross-realm operation. However, use of proactive mode can be preferable in many circumstances over reactive mode because the handover performance does not depend on the location of the KDC.

3.3 Key Lifetime

Since a Kerberos ticket contains a key lifetime, it is possible to assign different key lifetimes (or different authorization lifetimes if the key lifetime is same as the authorization time) for different authenticators depending on (but not limited to) link-layer type and location, to provide flexibility in key management for heterogeneous link-layer technologies.

3.4 Authenticator Discovery

In proactive mode of KHK, the mobile node needs to discover authenticators in neighboring networks. An authenticator discovery mechanism needs to provide at least the following information.

Discovery of the identity of the authenticator so that the mobile node can identify it when obtaining a ticket for the authenticator from the KDC. Note that a single authenticator identity can be used for multiple network points of attachment (e.g., access points, base stations and/or access routers).

Discovery of an address of the authenticator so that the mobile node can communicate with the authenticator for an AP-REQ/AP-REP exchange. The address can be a link-layer address or an IP address. When a single authenticator identity is used for multiple network points of attachments, the authenticator identity is associated with multiple addresses.

In IEEE 802.11r (see, e.g., reference [14] below), the ROKH-ID and the BSSID advertised in a Beacon frame correspond to the identity and an address of the authenticator, respectively, but it is applicable to IEEE 802.11 link-layer only. On the other hand, a media-independent authenticator discovery mechanism is preferable to provide, e.g., all pieces of information described above. See, e.g., IEEE 802.21, Information Service (see, e.g., reference [1] below). IEEE 802.21 Information Service can provide such a mechanism because it provides various pieces of information on neighboring networks to facilitate handover decision-making process and is designed to work over any media.

3.5 Authorization and Accounting

Kerberos allows authorization information to be embedded in a ticket's authorization data when encapsulated by the KDC-issued authorization data element. If the authorization credentials issued by the KDC contain the entire authorization information that is needed by the authenticator to perform access control, it is possible to eliminate AAA signaling after handover not only for authentication but also for authorization.

A preferred authorization model used for Kerberized handover keying is described as follows:

The node that implements KDC also implements AAA client to communicate with an AAA server for authorization purposes.

When the KDC receives a TGS-REQ message from a Kerberos client (i.e., a mobile node in proactive mode or an authenticator in reactive mode), it asks the AAA client for authorization information for the Kerberos client. The AAA client obtains the authorization information from the AAA server using an AAA protocol and returns the obtained information to the KDC.

The KDC embeds the authorization information in the authorization data field of the ticket to be contained in a TGS-REP message.

In preferred embodiments, this authorization model has the following two requirements. First, the format and semantics of authorization credentials are standardized for interoperability. Second, in the case of reactive mode, the authorization information is carried in an encrypted data part of a TGS-REP message so that the Kerberos client in the reactive mode (e.g., an authenticator) is able to obtain the authorization information to be used for the mobile node.

Figure 15:
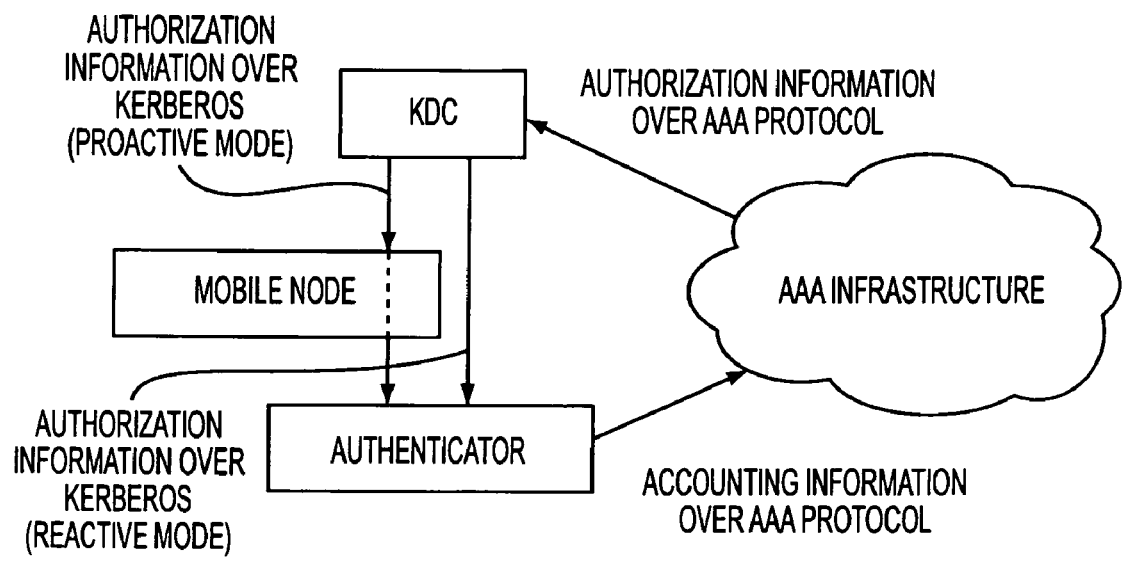
FIG. 15 is an architectural diagram depicting AAA interaction for authorization and accounting according to some proactive mode and reactive mode embodiments of the invention.

Accounting is performed on the authenticator as is done in existing link-layer technologies—e.g., the node that implements authenticator also implements the AAA client for accounting. In order to associate accounting records with an appropriate authorization session, an authorization session identifier is preferably contained in the authorization credentials. The AAA interaction for authorization and accounting according to some embodiments is illustrated in FIG. 15, labeled AAA interaction for authorization and accounting. A notable difference between proactive mode and reactive mode with regard to authorization and accounting is that the KDC preferably indirectly passes the authorization information to the authenticator via the mobile node in proactive mode whereas the KDC preferably directly passes authorization information to the authenticator in reactive mode.

Note that the AAA client on the authenticator node also has authentication functionality for initial network access.

3.6 Mapping Kerberos Realms to AAA Domains

As described above, Kerberos is designed to operate across organizational boundaries. For example, a client in one organization can be authenticated to a server in another organization. In this regard, each organization wishing to run a Kerberos server establishes its own "realm." The name of the realm in which a client is registered is referred to as the local realm.

By establishing "inter-realm" keys, the administrators of two realms can allow a client authenticated in the local realm to prove its identity to the servers in other realms. In this regard, the exchange of inter-realm keys registers the ticket-granting service of each realm as a principal in the other realm. A client is then able to obtain a TGT for the remote realm's ticket-granting service from that client's local realm. When that TGT is used, the remote ticket-granting service uses the inter-realm key (which usually differs from its own normal TGS key) to decrypt the TGT. Preferably, tickets issued by the remote ticket-granting service will indicate to the end-service that the client was authenticated from another realm.

In general, Kerberos realms and AAA domains are independent. However, for a simplistic illustrative example, we introduce an exemplary operationally reasonable model. Here, we assume that Kerberized handover keying uses a DNS domain name as a Kerberos realm name and an AAA domain name.

Let D(n) denote a AAA domain whose DNS domain name is n. Let Rn be a set of Kerberos realms for which the realm name contain n in their suffix. The relationship between an AAA domain and Kerberos realms in KHK is represented as follows:

$$D(n)=Rn.$$

Figure 16:
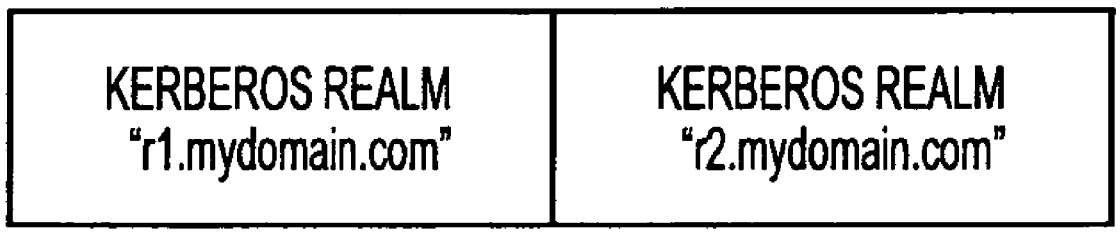
FIG. 16 is a schematic diagram depicting an example relationship between an AAA domain and a plurality of Kerberos realms.

This equation represents that an AAA domain has a set of Kerberos realms and that a mobile node can tell whether a particular Kerberos realm belongs to a particular AAA domain by using the name of the Kerberos realm and the name of the AAA domain. An illustrative example showing a mapping between an illustrative AAA domain and a plurality of illustrative Kerberos realms is shown in FIG. 16, labeled example relationship between AAA domain and Kerberos realms. It is desirable to defining multiple realms within a single AAA domain for KHK to be scalable as well as to reduce signaling latency by placing a KDC at a location as physically close to the mobile node as much as possible.

In preferred embodiments, in order to support seamless handover across AAA domains, it is desirable that there are pre-established Kerberos inter-realm keys between two AAA domains that have a roaming relationship with each other. When a mobile node moves from the serving authenticator to the target authenticator across AAA domains, it acquires a cross-realm TGT valid for the remote KDC in the visited AAA domain by contacting the local KDC in the home AAA domain. Preferably, if there are one or more intermediate realms between the local and remote realms, the mobile node iterates the TGT acquisition procedure along the authentication path. The authorization credentials generated by the local KDC need to be preserved in the cross-realm TGT used for the remote KDC.

Since the two AAA domains typically belong to different branches of the DNS domain hierarchy, the determination process of the authentication path is significant. In this case, the authentication path can be dynamically resolved using referrals of KDCs, such as specified in reference [15] below. In addition, a more optimized mechanism that eliminates the iteration of the TGT acquisition procedure also exists, such as described in reference [16] below.

Cross-realm operation of Kerberos is also possible for handover within the same AAA domain. When the mobile node moves from the serving authenticator to the target authenticator across Kerberos realms within the same AAA domain, it acquires a cross-realm TGT valid for the target KDC (i.e., the KDC for the target authenticator) by contacting the serving KDC (i.e., the KDC for the serving authenticator). In case there are one or more intermediate realms between the two KDCs in the same AAA domain, the mobile node preferably iterates the TGT acquisition procedure along the authentication path. The authorization credentials generated by the serving KDC need to be preserved in the cross-realm TGT used for the target KDC. The authentication path can be constructed based on the DNS domain hierarchy, which makes the traversal of the authentication path easier than the inter-domain case.

In reactive mode, the iteration of the TGT acquisition procedure needed for cross-realm operation is performed by the target authenticator instead of the mobile node. This effectively reduces Kerberos message exchanges over the link between the mobile node and the authenticator.

4. Bootstrapping Kerberos from EAP

Figure 17:
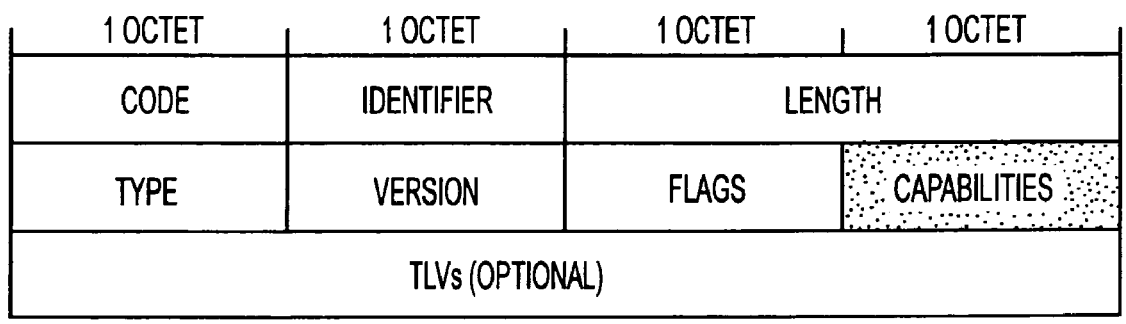
FIG. 17 is a diagram depicting an EAP-EXT message format with Kerberos bootstrapping capability according to some embodiments.
Figure 18:
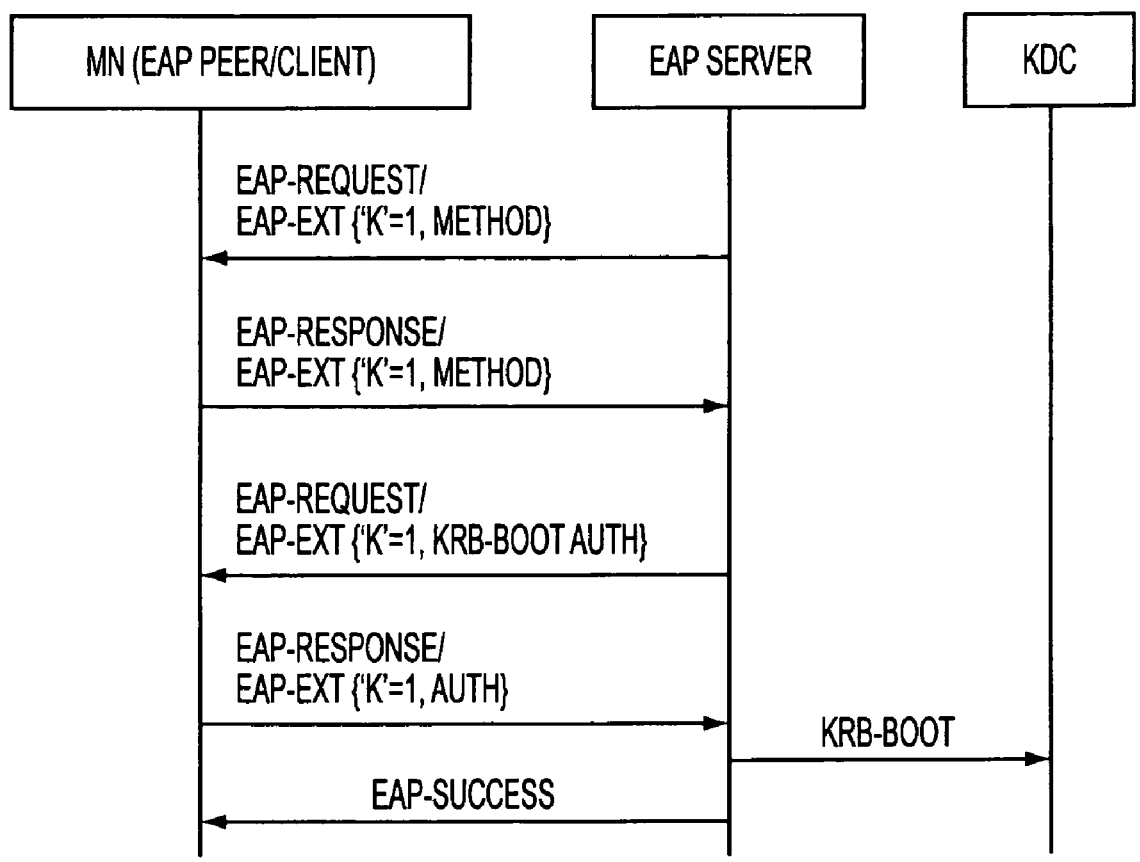
FIG. 18 is a diagram depicting a Kerberos bootstrapping sequence according to some embodiments.

To support roaming among multiple AAA domains, a mechanism is defined to dynamically configure the principal name of the local KDC and the secret key used for it as much as possible. For this purpose, a mechanism is proposed to bootstrap Kerberos from network access authentication credentials using EAP-EXT, described above and also discussed in reference [17] below, which is a new EAP method. As described above, EAP-EXT is a tunneling method that encapsulates any EAP authentication method and provides capabilities negotiation by which newly defined functionality can be enabled. EAP-EXT provides backward compatibility to the existing EAP authentication methods, as it makes the new functionality available while still using existing EAP methods without any modification to them. EAP-EXT currently defines a few capabilities—e.g., channel binding and re-authentication. In this context, however, a new capability is added for Kerberos to EAP-EXT. EAP-EXT message format with an additional capability bit (e.g., a 'K' bit) for Kerberos bootstrapping is shown in FIG. 17, labeled EAP-EXT message format with Kerberos bootstrapping capability.

Preferably, when both the peer and server set a 'K' bit in the final EAP-EXT message exchange which is integrity protected using the key exported from an inner EAP authentication method, the peer and server bootstrap Kerberos. The following information is required to bootstrap Kerberos and carried in a Kerberos-Boot (KRB-BOOT) TLV (Type-Length-Value) in the final EAP-EXT request message with 'K' bit set: a) the length and the lifetime of the secret key (EAP-KRB-KEY) to be shared between the mobile node and local KDC; b) the principal name and realm of the local KDC; and c) the IP address of the local KDC.

An EAP-KRB-KEY is derived from the EMSK (EAP Master Session Key) as a USRK (Usage Specific Root Key) (see, e.g., reference [18] below) as follows, where KDF denotes a key derivation function defined in reference [18] and length denotes the length of the derived key.

EAP-KRB-KEY=KDF(EMSK, "EAP-EXT-Kerberos-Boot-Key", length).

Figure 1:
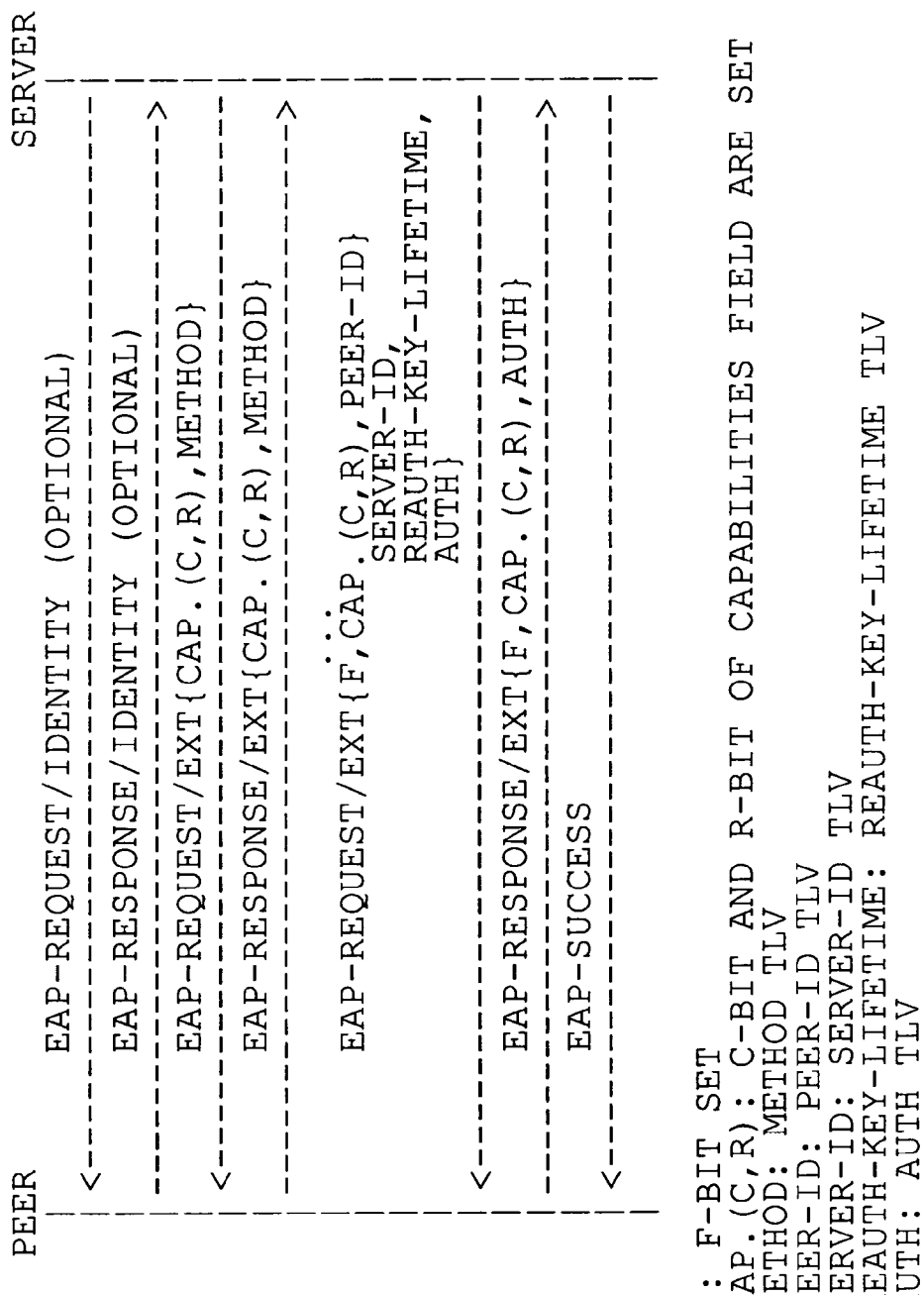
FIG. 1 is a diagram depicting an illustrative EAP-EXT message sequence between an EAP Server and an EAP Peer with a single inner method according to some embodiments.
Figure 2:
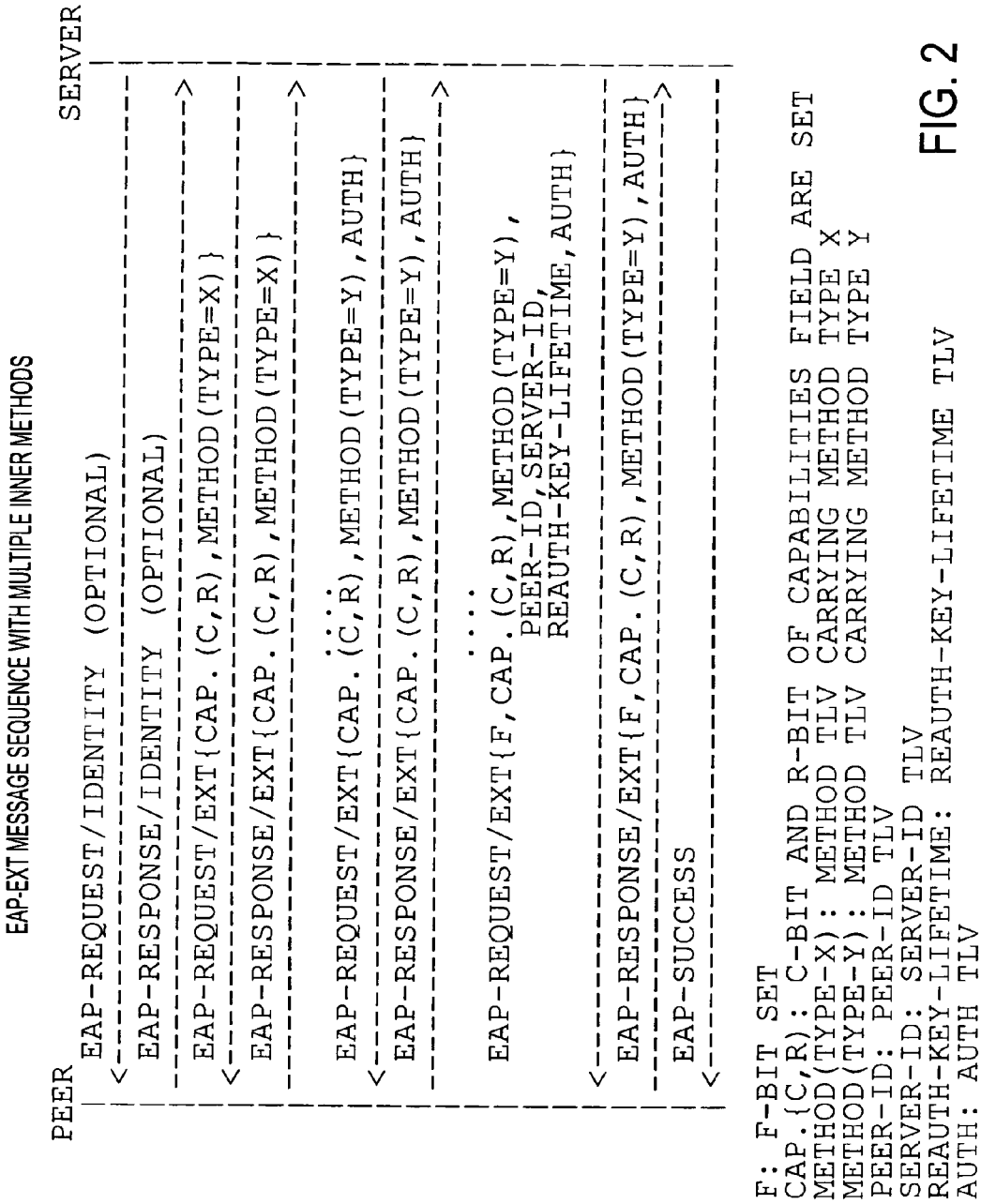
FIG. 2 is a diagram depicting an illustrative EAP-EXT message sequence between an EAP Server and an EAP Peer with multiple inner methods according to some embodiments.
Figure 3A:
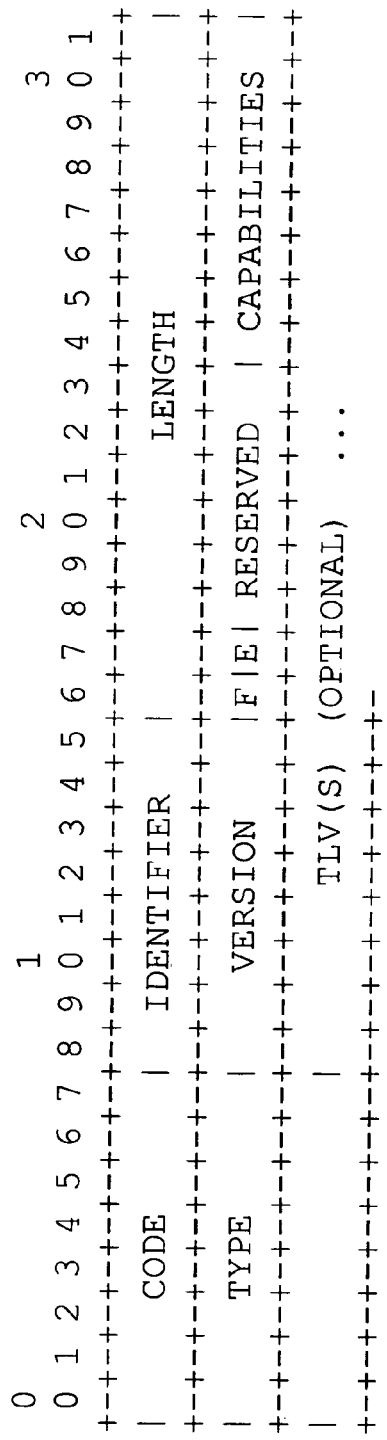
FIG. 3(A) is a diagram depicting illustrative message formats according to some exemplary embodiments related to EAP-EXP.
Figure 3B:
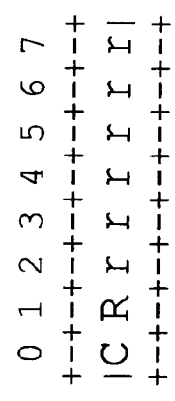
FIG. 3(B) is a diagram depicting an illustrative capabilities field according to some exemplary embodiments related to EAP-EXP.
Figure 3C:
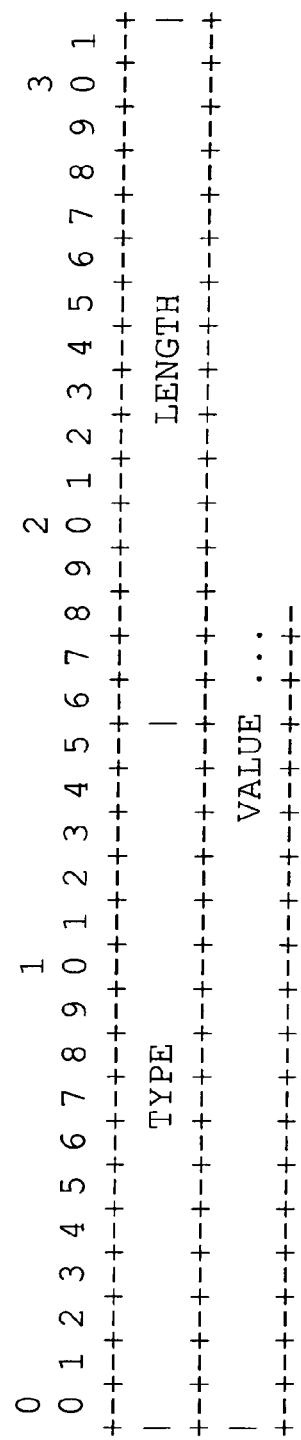
FIG. 3(C) is a diagram depicting an illustrative TLV format according to some exemplary embodiments related to EAP-EXP.
Figure 4:
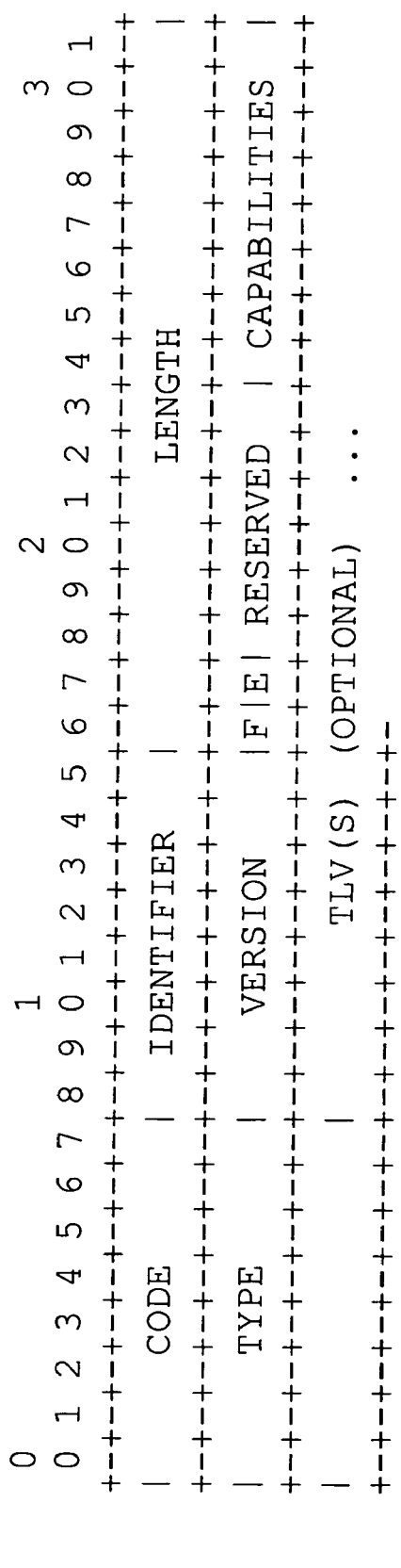
FIG. 4 is a diagram depicting illustrative message formats according to some exemplary embodiments of the present invention.
Figure 5:
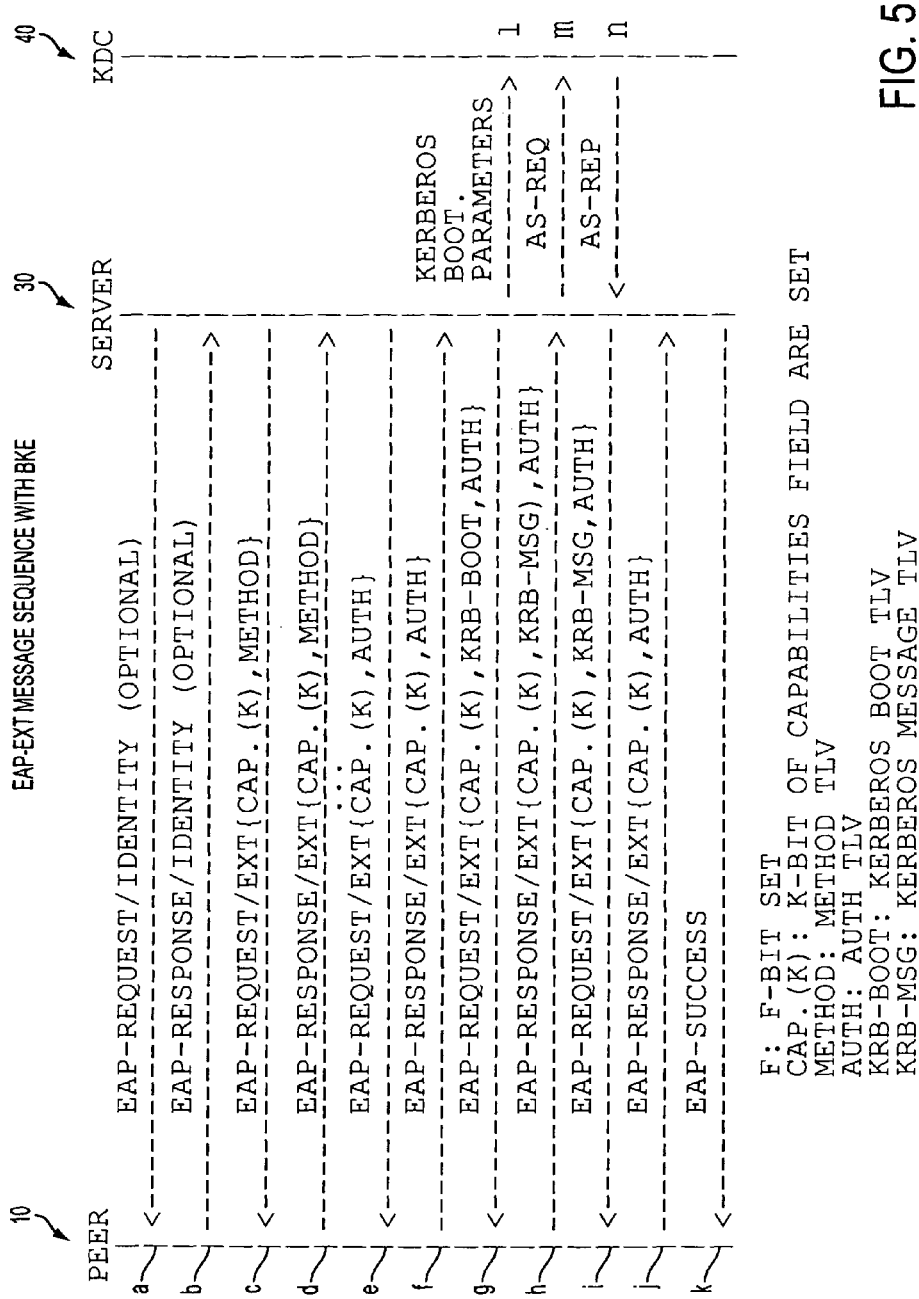
Figure 6:
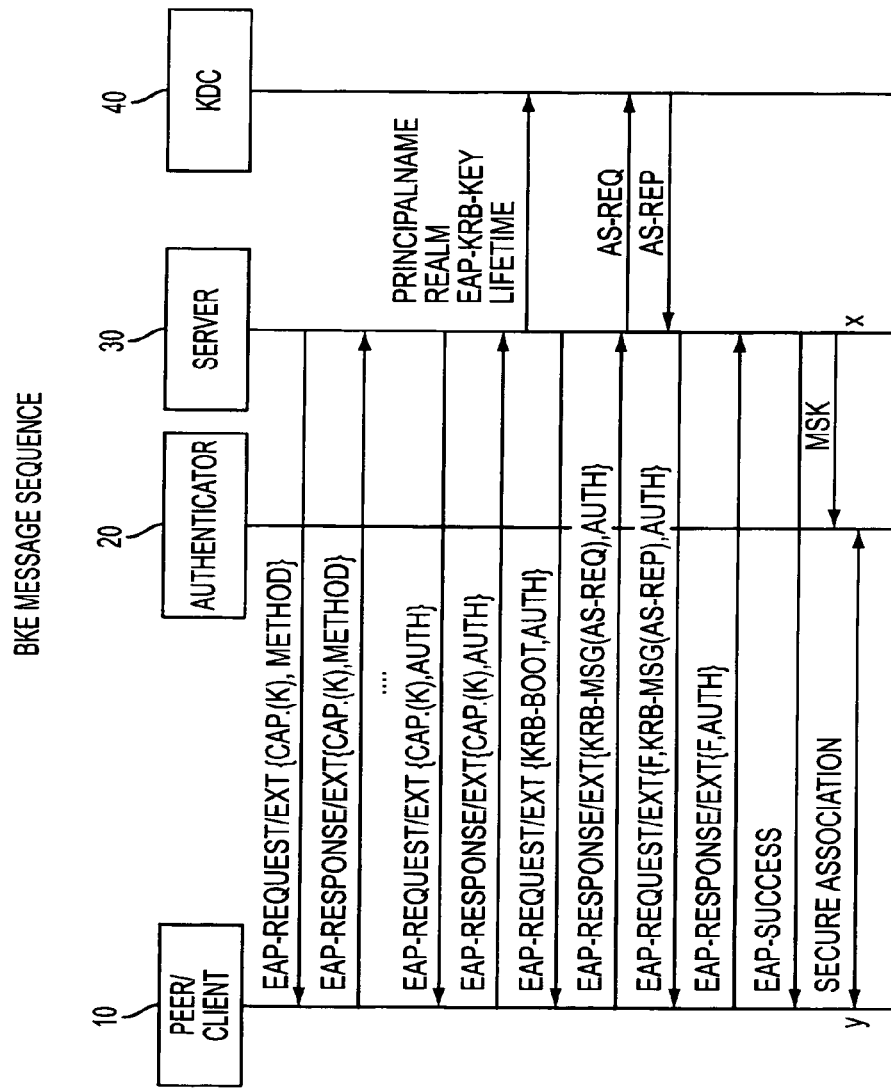
Figure 7:
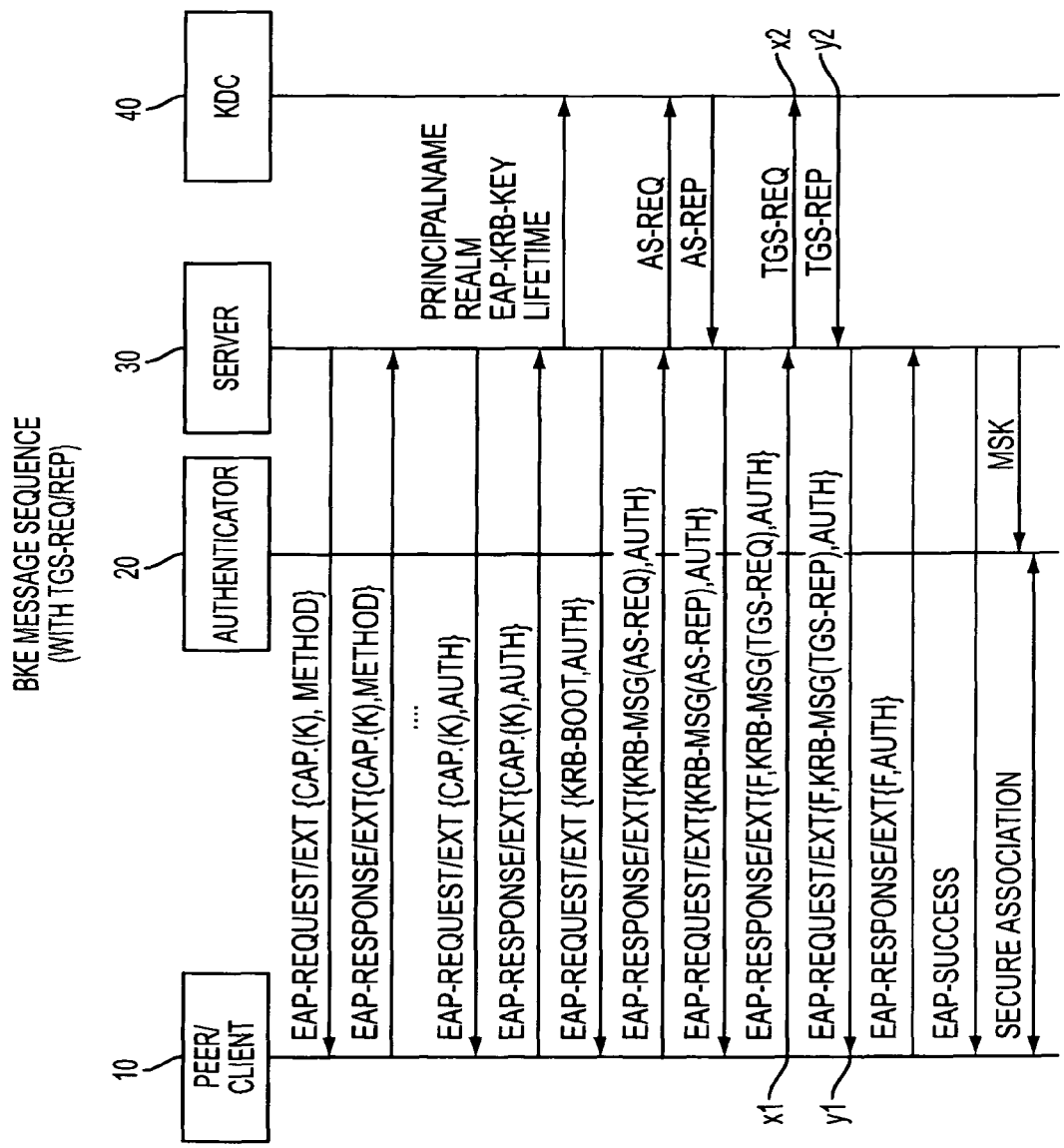
FIG. 7 is another message sequence according to some illustrative embodiments employing BKE functionality, further including TGS-REQ/REP.
Figure 8:
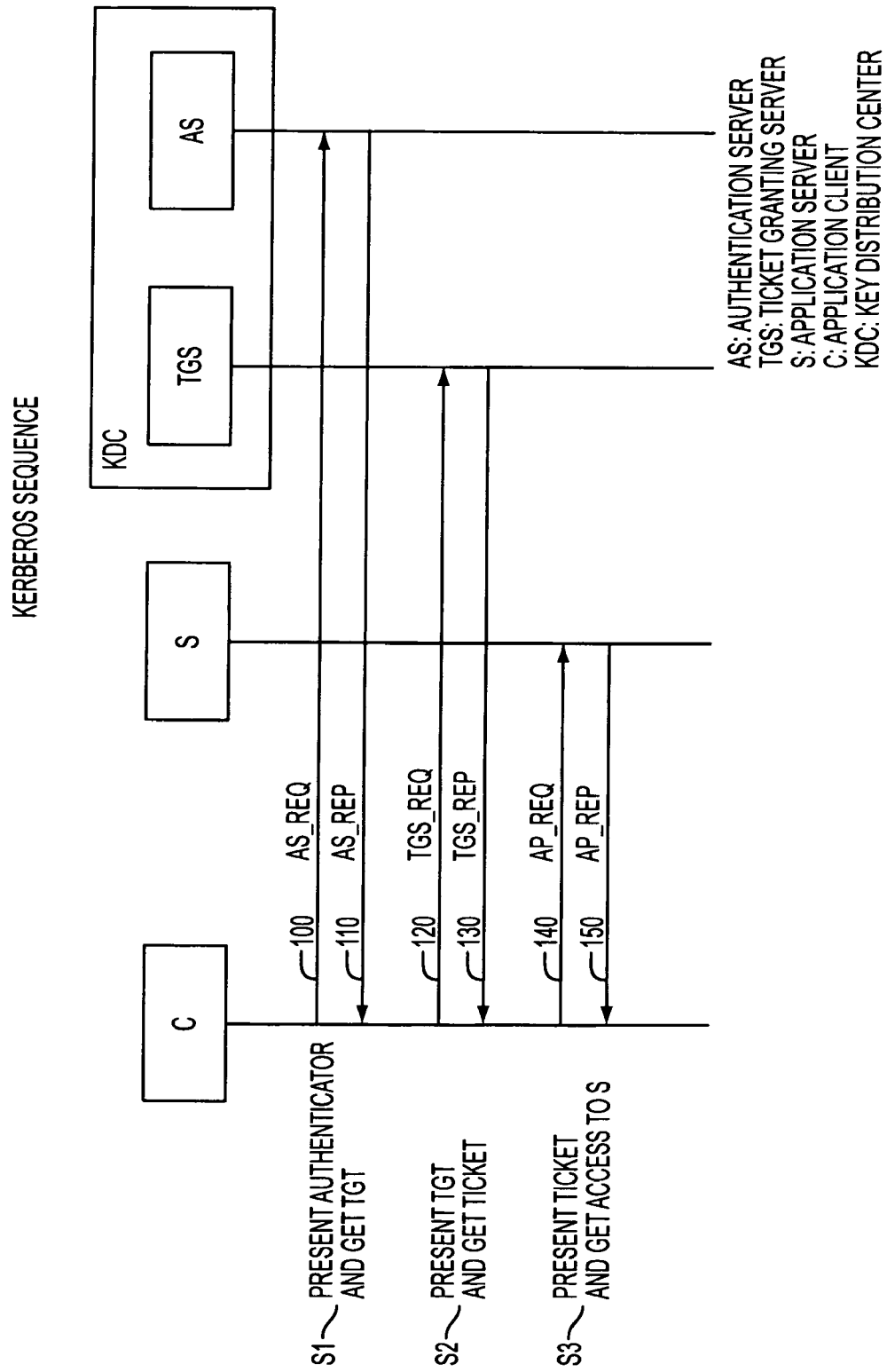
FIG. 8 is a background diagram depicting Kerberos message sequencing for reference.

The EAP server also installs the information carried in the KRB-BOOT TLV to the local KDC as shown in FIG. 8, labeled Kerberos Boostrapping Sequence, where "Method" denotes a Method TLV that carries an EAP method payload and AUTH denotes an AUTH TLV that carries integrity protection data.

In order to simplify the Kerberos bootstrapping procedure, the EAP server and the local KDC are most preferably implemented on the same node using the same identifier for the EAP server identity and the local KDC. Otherwise, a three-party key distribution protocol would be needed for the key distribution among the EAP peer, the EAP server, and the local KDC to securely transport the secret key.

5. Concluding Notes.

The above sections set forth a new media-independent handover key management architecture using Kerberos to address a number of issues, and also set forth how the architecture works across multiple AAA domains and explains how Kerberos can be bootstrapped from initial access authentication using an EAP method. In implementing the KHK methodology, it would be desirable for standard bodies, such as, e.g., the I.E.T.F. and I.E.E.E. 802 to define a set of protocols required for KHK, including modification to the Kerberos protocol, Kerberos bootstrapping, and link-layer transport of Kerberos. Additionally, bootstrapping Kerberos from initial network access authentication as described in Section 4 allows not only bootstrapping KHK but also bootstrapping security for many other applications such as, SSO (Single-Sign On).

REFERENCES

The entire disclosures of the following background references are incorporated herein by reference.

[1] "Draft IEEE Standard for Local and Metropolitan Area Networks: Media Independent Handover Services," IEEE LAN/MAN Draft IEEE P802.21/D05.00, April 2007.
[2] B. Aboba, L. Blunk, J. Vollbrecht, J. Carlson and H. Levkowetz, "Extensible Authentication Protocol (EAP)," RFC 3748, June 2004 (see also reference [RFC3748] discussed above).
[3] "IEEE Standard for Local and Metropolitan Area Networks Port-Based Network Access Control," IEEE Std. 802.1X-2004.
[4] "IEEE Standard for Local and metropolitan area networks—Specific requirements Part 11: Wireless LAN MAC and PHY specifications Amendment 6: Medium Access control (MAC) Security Enhancements," IEEE 802.11i-2004.
[5] "IEEE Standard for Local and metropolitan area network-Part 16: Air Interface for Fixed and Mobile Broadband Wireless Access Systems Amendment 2," IEEE 802.162005 and IEEE Std 802.16-2004/Cor1-2005.
[6] C. Kaufman, "Internet Key Exchange (IKEv2) Protocol", December 2005 (see also reference [RFC4306] discussed above).
[7] D. Forsberg, Y. Ohba, B. Patil, H. Tschofenig, and A. Yegin, "Protocol for Carrying Authentication for Network Access (PANA)," Internet-Draft, work in progress, May 2007.
[8] B. Aboba, D. Simon, "PPP EAP TLS Authentication Protocol", RFC 2716, October 1999.
[9] IETF HOKEY WG charter, www.ietf.org/html.charters/hokey-charter.html.
[10] A. Dutta, T. Zhang, Y. Ohba, K. Taniuchi, and J. Schulzrinne, "MPA assisted Optimized Proactive Handover Scheme," Mobiquitous 2005.
[11] C. Neuman, T. Yu, S. Hartman and K. Raeburn, "The Kerberos Network Authentication Service (V5)", RFC 4120, July 2005 (see also reference [RFC4120] discussed above).
[12] B. Aboba, "EAP GSS Authentication Protocol", tools.ietf.org/html/draft-aboba-pppext-eapgss-12, August 2002.
[13] R. Lopez, A. Dutta, Y. Ohba, H. Schulzrinne and A. Skarmeta, "Network-Layer Assisted Mechanism for reducing authentication delay during handoff in 802.11 Networks", to appear in Mobiquitous 2007.
[14] "Draft IEEE Standard for Local and metropolitan area networks—Specific requirements Part 11: Wireless LAN MAC and PHY specifications Amendment 2: Fast BSS Transition", IEEE P802.11r/D6.0, May 2007.
[15] K. Raeburn and L. Zhu, "Generating KDC Referrals to Locate Kerberos Realms", Internet-Draft, work in progress, March 2007.
[16] S. Zrelli, Y. Shinoda, S. Sakane, K. Kamada and M. Ishiyama, "XTGSP, the Inter-TGS protocol for cross-realm operations in Kerberos", Internet-Draft, work in progress, March 2007.
[17] Y. Ohba, S. Das and R. Lopez, "An EAP Method for EAP Extension (EAP-EXT)", Internet-Draft, work in progress, March 2007.
[18] J. Salowey, L. Dondeti, V. Narayanan and M. Nakhjiri, "Specification for the Derivation of Usage Specific Root Keys (USRK) from an Extended Master Session Key (EMSK)", Internet-Draft, work in progress, January 2007.

Illustrative Computer Architectures:

FIG. 19 shows illustrative computer or the like structure that can be used to implement process steps and communications, to be carried out by devices or entities, such as, e.g., peers, clients, servers, authenticators, mobile devices, access points, etc., in some illustrative embodiments. In some embodiments, such devices or entities include a central processing unit (CPU) 322, which can communicate with a set of input/output (I/O) device(s) 324 over a bus 326. The I/O devices 324 can include, for example, keypad(s), display(s), and/or other devices. The devices can also include transmitters, receivers and/or transceivers (e.g., employing antennas or the like) for communications, which communications can include wireless communications, wired communications, etc., as appropriate for achieving appropriate device functionality as would be appreciated by those in the art based this disclosure. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via computer program products for use with computer systems. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for media-independent handover key management for secure key distribution among a server, an authenticator and a mobile node employing Kerberized Handover Keying, comprising:
   a) having a mobile node obtain the identity of a Key Distribution Center and a secret key shared with an Application Server during initial network access authentication to an initial network via bootstrapping Kerberos from network access authentication credentials using an EAP method, and having the mobile node transmit an Authentication Service Request (AS-REQ) to the a Key Distribution Center, and having the mobile node receive an Authentication Service Response (AS-REP) from the Key Distribution Center with a Ticket Granting Ticket (TGT);
   b) prior to handover from said initial network, having the mobile node discover at least one authenticator in neighboring networks to which said mobile node may handover;
   c) prior to handover from said initial network, having the mobile node transmit a Ticket Granting Service Request (TGS-REQ) to said Key Distribution Center, and having the mobile node receive a Ticket Granting Service Response (TGS-REP) from the Key Distribution Center to obtain a different ticket (T) for each of said at least one authenticator;
   d) during handover to a target authenticator of said at least one authenticator, having the mobile node transmit an Application Request (AP-REQ) to the target authenticator so that the mobile node and the target authenticator act as a client and a server of Kerberos, respectively;
   e) further including after said step d), having the mobile node exchange Kerberos-Safe (KRB-Safe) messages or link-layer specific messages with the target authenticator such as to establish a link-layer security association between the mobile node and the target authenticator;
   f) having a node that implements the Key Distribution Center also implement or communicate with an Authentication, Authorization and Accounting (AAA) client that communicates with an AAA server for authorization purposes, and having said AAA client obtain authorization information from the AAA server using an AAA protocol and return the obtained authorization information to the Key Distribution Center;
   g) having said Key Distribution Center embed the authorization information in ticket authorization data of each said different ticket for each of said at least one authenticator such that the target authenticator performs access control without Authentication, Authorization and Accounting (AAA) signaling after handover for authorization; and
   h) wherein said at least one authenticator includes a plurality of authenticators and said mobile node is configured to receive per-authenticator keys for said plurality of authenticators.

2. The method of claim 1, further including establishing a secure association between the mobile node and the target authenticator using the respective ticket (T) for that authenticator.

3. The method of claim 1, further including after having the mobile node transmit an AP-REQ to the target authenticator having the target authenticator transmit an Application Response (AP-REP) message to the mobile node.

4. The method of claim 1, wherein said step of having the mobile node discover at least one authenticator includes having said mobile node employ I.E.E.E. 802.21 Information Service discovery mechanisms.

5. The method of claim 1, further including having the Key Distribution Center indirectly pass the authorization information to the target authenticator via the mobile node in a proactive mode.

6. The method of claim 5, further including having one or more intermediate realms between a local realm and a remote realm, and the mobile node iterating the Ticket Granting Ticket procedure along an authentication path between the local and remote realms.

7. The method of claim 1, further including establishing inter-realm keys for different Kerberos realms, such that said mobile node is able to obtain a Ticket Granting Ticket for a remote Kerberos realm's ticket granting service from a local Kerberos realm.

8. The method of claim 7, further including pre-establishing Kerberos cross-realm keys between plural Authentication, Authorization and Accounting (AAA) domains, such that when said mobile node moves from an initial authenticator to a target authenticator across AAA domains, the mobile node acquires a cross-realm Ticket Granting Ticket valid for a remote Key Distribution Center in a visited target AAA domain by contacting a local Key Distribution Center in a home AAA domain.

9. The method of claim 7, further including having cross-realm operation within a single AAA domain, wherein there are one or more intermediate realms between a local realm and a remote realm in the same AAA domain, and the mobile node iterates the Ticket Granting Ticket procedure along the authentication path between the realms, and wherein the authentication path is constructed based on a Domain Name System (DNS) domain hierarchy to facilitate traversal of the authentication path.

10. The method of claim 1, further including: having said mobile node establish security associations with a set of authenticators using Kerberos prior to handover.

11. The method of claim 10, further including having said mobile node include a Kerberos client that communicates with respective Kerberos servers of said authenticators.

12. The method of claim 10, further including delivering a Ticket Granting Ticket to an authenticator prior to handover of the mobile node.

13. The method of claim 10, further including having the authenticator not create a state for the mobile node before handover.

14. The method of claim 10, wherein for said bootstrapping, an EAP server and the Key Distribution Center are implemented on the same node using a same identifier for the EAP server identity and the Key Distribution Center.

15. The method of claim 1, further including assigning different key lifetimes to different ones of said plurality of authenticators depending on link-layer type such as to provide flexibility in key management for heterogeneous link-layer technologies.

16. A media-independent handover key management system for secure key distribution among a server, an authenticator and a mobile node, comprising:
- a) a mobile node having an Extensible Authentication Protocol (EAP) peer that is configured to communicate with an EAP server, said mobile node being configured to perform EAP signaling with an initial authenticator for initial network access authentication to an initial network;
- b) said mobile node further having a Kerberos client or server that is configured to communicate with at least one authenticator for at least one target network that has a respective Kerberos client or server;
- c) said mobile node being configured to perform security signaling during handover from said initial network to said at least one target network via said at least one authenticator, including network access authentication and key management signaling to obtain master session keys from a Key Distribution Center using Kerberos to dynamically establish a security association via said at least one authenticator without re-authentication using EAP and Authentication, Authorization and Accounting (AAA) signaling, including said mobile node being configured to obtain a different per-authenticator master session key using Kerberos for dynamically establishing a security association for a respective one of said at least one authenticator in the at least one target network to which the mobile node may handover without communicating with said at least one authenticator before handover, wherein the mobile node exchanges Kerberos-Safe (KRB-Safe) messages or link-layer specific messages with the target authenticator to establish a link-layer security association between the mobile node and the target authenticator;
- d) a node that implements the Key Distribution Center being configured to also implement or communicate with an Authentication, Authorization and Accounting (AAA) client that communicates with an AAA server for authorization purposes, and having said AAA client obtain authorization information from the AAA server using an AAA protocol and return the obtained authorization information to the Key Distribution Center;
- e) said Key Distribution Center being configured to embed the authorization information in ticket authorization data of each said different ticket for each of said at least one authenticator such that the target authenticator performs access control without Authentication, Authorization and Accounting (AAA) signaling after handover for authorization; and
- f) wherein said at least one authenticator includes a plurality of authenticators and said mobile node is configured to receive per-authenticator keys for said plurality of authenticators.

17. The media-independent handover key management system of claim 16, wherein said mobile node has a Kerberos client.

18. The media-independent handover key management system of claim 16, wherein said mobile node is configured to proactively obtain per-authenticator keys for said plurality of authenticators.

19. The media-independent handover key management system of claim 16, wherein said plurality of authenticators includes at least one access point or base station.

20. The media-independent handover key management system of claim 16, further including assigning different key lifetimes to different ones of said plurality of authenticators depending on link-layer type such as to provide flexibility in key management for heterogeneous link-layer technologies.

* * * * *

UNITED STATES PATENT AND TRADEMARK OFFICE
CERTIFICATE OF CORRECTION

PATENT NO. : 8,332,923 B2  
APPLICATION NO. : 11/972450  
DATED : December 11, 2012  
INVENTOR(S) : Oba et al.

Page 1 of 1

It is certified that error appears in the above-identified patent and that said Letters Patent is hereby corrected as shown below:

On the Title Page

On Page 2, in item (56), under "OTHER PUBLICATIONS", in Column 1, Line 8, delete "Authentation" and insert -- Authentication --, therefor.

On Page 2, in item (56), under "OTHER PUBLICATIONS", in Column 1, Line 11, delete "Protcol for Mibile" and insert -- Protocol for Mobile --, therefor.

On Page 2, in item (56), under "OTHER PUBLICATIONS", in Column 2, Line 5, delete "commerical" and insert -- commercial --, therefor.

In the Specification

In Column 10, Line 67, delete "|T4|" and insert -- |T4|... --, therefor.

Signed and Sealed this  
Twenty-eighth Day of October, 2014

Michelle K. Lee  
*Deputy Director of the United States Patent and Trademark Office*